United States Patent
Brokenshire et al.

(10) Patent No.: US 8,032,871 B2
(45) Date of Patent: Oct. 4, 2011

(54) PARTITIONING PROCESSOR RESOURCES BASED ON MEMORY USAGE

(75) Inventors: Daniel Alan Brokenshire, Round Rock, TX (US); Barry L Minor, Austin, TX (US); Mark Richard Nutter, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 418 days.

(21) Appl. No.: 12/365,413

(22) Filed: Feb. 4, 2009

(65) Prior Publication Data

US 2009/0138689 A1 May 28, 2009

Related U.S. Application Data

(63) Continuation of application No. 11/050,020, filed on Feb. 3, 2005, now Pat. No. 7,506,325, which is a continuation-in-part of application No. 10/960,609, filed on Oct. 7, 2004, now abandoned.

(51) Int. Cl.
   *G06F 9/45* (2006.01)
(52) U.S. Cl. .................................................. 717/140
(58) Field of Classification Search ............... 717/140
   See application file for complete search history.

(56) References Cited

U.S. PATENT DOCUMENTS

| | | | |
|---|---|---|---|
| 5,724,565 A | 3/1998 | Dubey et al. | 712/245 |
| 5,761,515 A | 6/1998 | Barton et al. | 717/158 |
| 5,953,530 A * | 9/1999 | Rishi et al. | 717/127 |
| 6,049,867 A * | 4/2000 | Eickemeyer et al. | 712/228 |
| 6,526,491 B2 | 2/2003 | Suzuoki et al. | 711/164 |
| 6,549,959 B1 | 4/2003 | Yates et al. | 710/22 |
| 6,559,854 B2 | 5/2003 | Oka et al. | 345/619 |
| 2001/0002130 A1 | 5/2001 | Suzuoki | 345/420 |
| 2002/0046229 A1 | 4/2002 | Yutaka et al. | 709/102 |
| 2002/0060690 A1 | 5/2002 | Tanaka et al. | 345/619 |
| 2002/0095523 A1 | 7/2002 | Shimakawa et al. | 709/316 |
| 2002/0135582 A1 | 9/2002 | Suzuoki et al. | 345/502 |
| 2002/0138637 A1 | 9/2002 | Suzuoki et al. | 709/230 |
| 2002/0138701 A1 | 9/2002 | Suzuoki et al. | 711/154 |
| 2002/0138707 A1 | 9/2002 | Suzuoki et al. | 711/163 |
| 2002/0156993 A1 | 10/2002 | Suzuoki et al. | 712/30 |
| 2003/0055984 A1 | 3/2003 | Shimakawa et al. | 709/316 |
| 2005/0081016 A1* | 4/2005 | Sakai et al. | 712/1 |
| 2005/0081201 A1* | 4/2005 | Aguilar et al. | 718/100 |
| 2005/0086652 A1 | 4/2005 | Tian et al. | 717/151 |

\* cited by examiner

*Primary Examiner* — Wei Zhen
*Assistant Examiner* — Junchun Wu
(74) *Attorney, Agent, or Firm* — Van Leeuwen & Van Leeuwen; Matthew B. Talpis

(57) ABSTRACT

Processor resources are partitioned based on memory usage. A compiler determines the extent to which a process is memory-bound and accordingly divides the process into a number of threads. When a first thread encounters a prolonged instruction, the compiler inserts a conditional branch to a second thread. When the second thread encounters a prolonged instruction, a conditional branch to a third thread is executed. This continues until the last thread conditionally branches back to the first thread. An indirect segmented register file is used so that the "return to" and "branch to" logical registers within each thread are the same (e.g., R1 and R2) for each thread. These logical registers are mapped to hardware registers that store actual addresses. The indirect mapping is altered to bypass completed threads. When the last thread completes it may signal an external process.

10 Claims, 14 Drawing Sheets

*(no Prolonged Instructions)*

*(some Prolonged Instructions)*

*(many Prolonged Instructions)*

(result of compilation based on six distinct DMA requests)

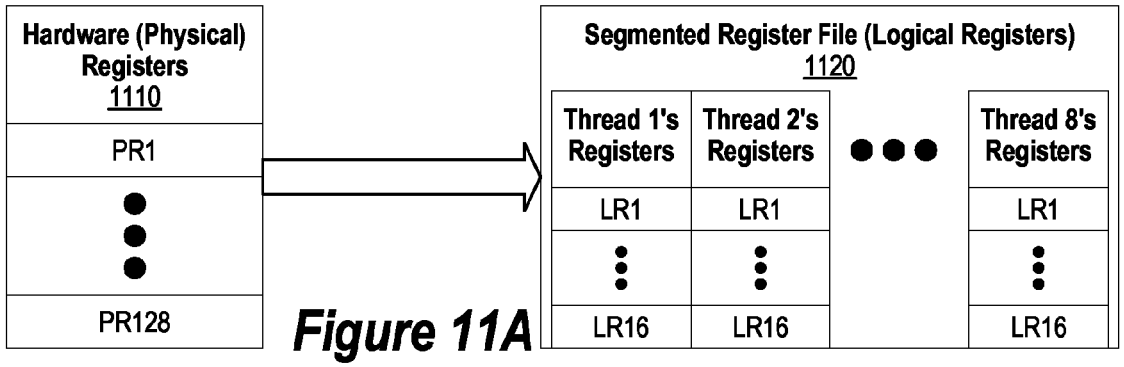

*Figure 11A*

| Physical Register | Hardware Register Mapping Example 1150 Description - Initial Mapping |
|---|---|
| PR1 | Thread 1's "return to" logical register and Thread 8's "branch to" logical register |
| PR2 | Thread 2's "return to" logical register and Thread 1's "branch to" logical register |
| PR3 | Thread 3's "return to" logical register and Thread 2's "branch to" logical register |
| PR4 | Thread 4's "return to" logical register and Thread 3's "branch to" logical register |
| PR5 | Thread 5's "return to" logical register and Thread 4's "branch to" logical register |
| PR6 | Thread 6's "return to" logical register and Thread 5s "branch to" logical register |
| PR7 | Thread 7's "return to" logical register and Thread 6's "branch to" logical register |
| PR8 | Thread 8's "return to" logical register and Thread 7's "branch to" logical register |

*Figure 11B*

Register Mapping - Initial 1160

Logical Register R1 stores "return to" address for thread
Logical Register R2 stores "branch to" address for thread

| Logical Register | Thread 1 | Thread 2 | Thread 3 | Thread 4 | Thread 5 | Thread 6 | Thread 7 | Thread 8 |
|---|---|---|---|---|---|---|---|---|
| LR1 | PR1 | PR2 | PR3 | PR4 | PR5 | PR6 | PR7 | PR8 |
| LR2 | PR2 | PR3 | PR4 | PR5 | PR6 | PR7 | PR8 | PR1 |

Register Mapping - After Thread 2 Finishes 1170

| Logical Register | Thread 1 | Thread 2 | Thread 3 | Thread 4 | Thread 5 | Thread 6 | Thread 7 | Thread 8 |
|---|---|---|---|---|---|---|---|---|
| LR1 | PR1 |  | PR3 | PR4 | PR5 | PR6 | PR7 | PR8 |
| LR2 | PR3 |  | PR4 | PR5 | PR6 | PR7 | PR8 | PR1 |

*Figure 11C* ations. More particularly, the present invention relates to a system and method for, in a multi-thread environment, automatically create additional threads in memory-bound processes in order to reduce memory latency.

PARTITIONING PROCESSOR RESOURCES BASED ON MEMORY USAGE

RELATED APPLICATIONS

This application is a continuation of commonly assigned, co-pending U.S. Non-Provisional patent application Ser. No. 11/050,020, entitled "Partitioning Processor Resources Based on Memory Usage," filing date Feb. 3, 2005, which is a continuation-in-part of commonly assigned, co-pending U.S. Non-Provisional patent application Ser. No. 10/960,609, entitled "Method for Hiding Memory Latency," filing date Oct. 7, 2004.

BACKGROUND OF THE INVENTION

1. Technical Field

The present invention relates in general to a system and method for partitioning processor resources based on memory usage. More particularly, the present invention relates to a system and method for, in a multi-thread environment, automatically create additional threads in memory-bound processes in order to reduce memory latency.

2. Description of the Related Art

Developers attempt to increase a computer system's performance by improving both the hardware aspects and the software aspects of the computer system. From a hardware perspective, a hardware developer may focus on improving areas such as a microprocessor's speed, bus interface speed, and memory size. From a software perspective, a developer may design an application to invoke multiple threads in order to increase the application's performance. For example, a gaming application may invoke a thread to render terrain data for the left half of a computer screen, and invoke a second thread to render terrain data for the right half of the computer screen. Each thread is given "control" at particular times and it is during these control times that a thread executes instructions.

In addition, a software developer may increase software performance by minimizing code latency. Code latency occurs when one line of code is waiting on another line of code to finish executing. There are instructions, however, that take a prolonged amount of time to execute. These "prolonged instructions" typically include operations that retrieve data from a memory area, such as a Direct Memory Access (DMA) operation. A challenge found with prolonged instructions is removing the latency that results when an application waits for the prolonged instruction to finish.

A further challenge is found when an application invokes multiple threads and one of the threads encounters a prolonged instruction. Because the thread that encountered the prolonged instruction has control, the other threads sit idle. This challenge is exacerbated when an application is more memory-bound. In memory-bound applications, the threads wait for each memory request, thus compounding the problem when numerous memory requests are performed.

What is needed, therefore, is a system and method to hide a prolonged instruction's code latency in a multi-threaded environment. What is further needed is a system and method that dynamically partitions the processor's resources based upon the application's memory usage.

SUMMARY

It has been discovered that the aforementioned challenges are resolved by passing control to a second thread while a first thread processes a prolonged instruction using branch instructions. At compile time, Branch Indirect and Set Link if External Data (BISLED) instructions are placed in thread code at instances that correspond to a thread's prolonged instruction. A prolonged instruction is an instruction that may instigate latency in a computer system, such as a DMA instruction. When a first thread encounters a BISLED instruction, the first thread passes control to a second thread while the first thread's prolonged instruction executes, thereby masking the latency of the first thread's prolonged instruction.

A computer application includes a plurality of threads that point to one another in a round-robin fashion using an indirect segmented register file. The first thread begins execution and encounters a prolonged instruction, such as a DMA instruction. The first thread's next instruction is a conditional branch (BISLED) instruction. A BISLED instruction modifies a link register of another thread such that when control is passed back to the first thread, the first thread checks as to whether the prolonged instruction is complete. If the prolonged instruction is not complete, the first thread continues to pass control away to the next thread in the circuit until the prolonged instruction is complete.

When the first thread encounters a conditional branch (BISLED) instruction, the first thread determines that its prolonged instruction is still being processed, and initiates steps to branch to another thread as determined by the indirect segmented register file. When control is passed back to the first thread, the conditional branch is checked once again to determine whether the prolonged instruction has completed. The first thread retrieves the second thread's return address from a second register and passes control to the second thread. Likewise, the second thread eventually passes control to a third thread, and so on, until the last thread in the chain passes control back to the first thread.

In a memory-bound application, multiple prolonged instructions (e.g., DMA commands) may be found. In order to further hide the latency involved in multiple prolonged instructions, additional threads are created by the compiler based upon the extent to which the application is memory-bound. The more memory bound, the more threads that are created by the compiler. When one thread encounters a prolonged instruction, it sets its "return to" register. The thread then conditionally branches to its "branch to" register, which corresponds to another thread's "return to" register. In one embodiment, the threads are arranged in a round-robin fashion so that the last thread's "branch to" register maps to the first thread's "return to" register.

In one embodiment, an indirect segmented register file is used to dynamically map the physical registers to the various threads. This mapping can allocate the registers equally amongst the threads or can provide one or more of the threads with more registers to better accommodate threads that are computationally intensive. For example, in a system with 128 hardware registers, a process could be divided up into eight threads each of which receives 16 registers, or the process could be divided up into seven threads with one computationally bound thread receiving 32 registers and the remaining six threads each receiving 16 registers apiece. Using dynamic mapping, each thread is compiled using the same logical registers (e.g., R1 through R16). The underlying mapping can then be changed without changing the logical registers found in the thread's code.

To facilitate a thread relinquishing control to another thread, two logical registers are used (e.g., R1 and R2). One of the registers (e.g., R1) is used to store the thread's "return to" address (the address in the thread to which another thread will branch), and the other thread (e.g., R2) is used to read the "branch to" address of the next thread in the circuit. For example, thread 2's "return to" address is mapped to hardware register HW2 and thread 1's "branch to" address is also mapped to HW2. When thread 1 is ready to relinquish control to thread 2, it branches to the address in logical register R2, the value of which was provided by thread 1 when it wrote to its logical register R1 when it relinquished control. When one of the thread's completes, the mapping contained in the indirect segmented register file is simply updated. For example, when thread 2 completes, thread 1's logical "branch to" register (R2) can simply be remapped to point to thread 3's "return to" address (e.g., HW3). When there is only on thread that has not yet completed, the "return to" and "branch to" registers for that thread will both point to the same hardware register (e.g., thread 1's R1 and R2 both point to HW1) and will therefore have the same address. When ready to complete, the last thread can recognize that processing is about to complete and can notify an external process that processing has completed.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

FIG. 11A is a diagram showing an indirect segmented register file to provide each thread with logical registers that are mapped to real (hardware) registers;

FIG. 11B is a diagram showing the mapping of eight hardware registers used to control flow between eight threads;

FIG. 11c is a diagram of mapping logical registers to hardware registers and dynamically re-mapping the registers when one of the thread completes;

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
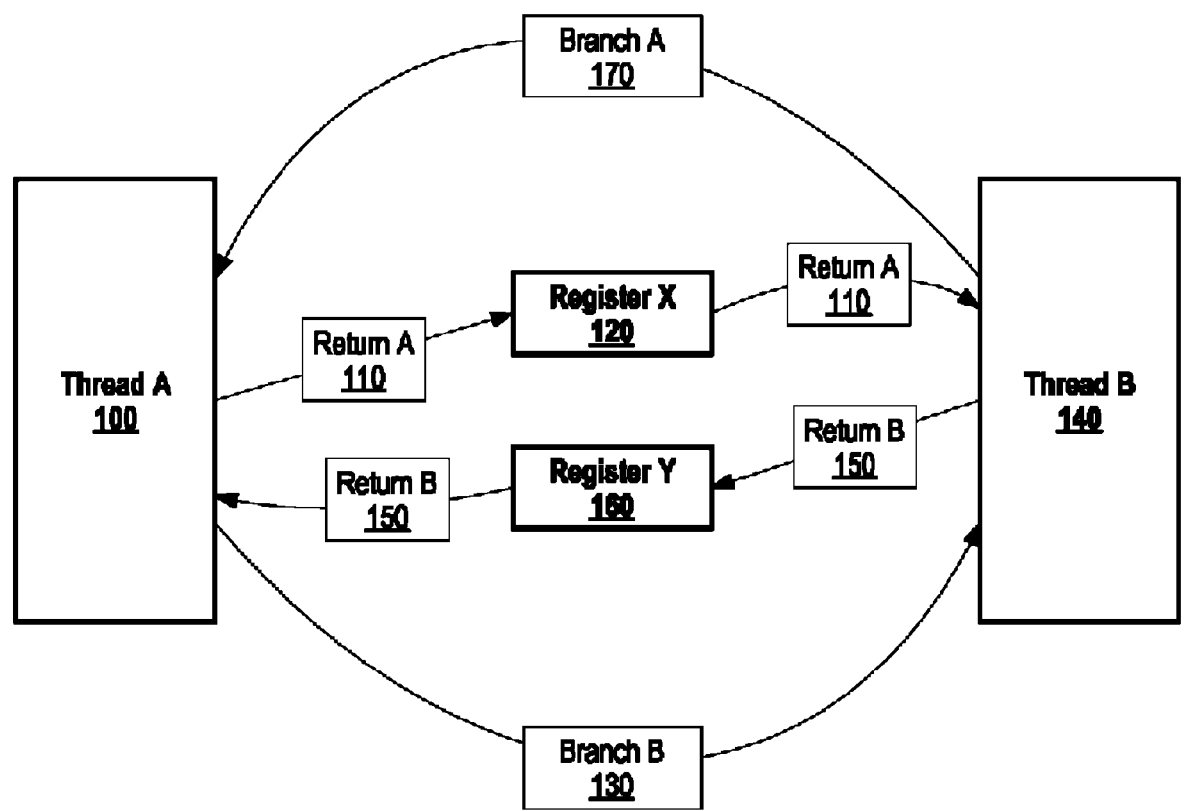
FIG. 1 is a diagram showing two threads branching to each other when the threads encounter a prolonged instruction.

FIG. 1 is a diagram showing two threads branching to each other when the threads encounter a prolonged instruction. While the example shown in FIG. 1 includes two threads, the invention described herein is not limited to two threads and, as one skilled in the art can appreciate, the invention is applicable to any number of multiple threads. At compile time, Branch Indirect and Set Link (BISL) and/or Branch Indirect and Set Link if External Data (BISLED) instructions are placed in thread code at instances that correspond to a thread's prolonged instruction. A prolonged instruction is an instruction that may instigate latency in a computer system, such as a DMA instruction. When a first thread encounters a BISL or a BISLED instruction, the first thread passes control to a second thread while the first thread's prolonged instruction executes. In turn, the computer system masks the latency of the first thread's prolonged instruction (see FIGS. 2A, 2B, and corresponding text for further details regarding branch instruction placement).

A BISLED instruction modifies a link register of another thread by two instructions so that processing returns to the BISLED instruction in order to check whether the prolonged instruction is complete. If the prolonged instruction is not complete, the thread continues to pass control away to another thread until the prolonged instruction is complete. With a BISL instruction, the thread passes control away to another thread once, and then waits until control comes back to the thread. Once control is passed back, the thread waits until the prolonged instruction is complete and then proceeds to process more instructions.

FIG. 1 shows two threads, which are thread A 100 and thread B 140. Both threads include BISL and/or BISLED instructions. Thread A 100 encounters a prolonged instruction, such as a DMA instruction, and begins processing the prolonged instruction. Thread A 100's next instruction is either a BISL or a BISLED instruction.

As such, thread A 100 determines that the prolonged instruction is still being processed, and, therefore, thread A 100 initiates the steps to branch to thread B 140. Thread A 100 stores return A 110 in register X 120, whereby return A 110 corresponds to an address for which to return when control is passed back to thread A 100. If the branch instruction is a BISL instruction, return A 110 corresponds to the instruction after the BISL instruction. If the return address is a BISLED instruction, return A 110 corresponds to the BISLED instruction such that when control is passed back to thread A 100, the prolonged instruction condition is checked once again. Thread A 100 retrieves return B 150 from register Y 160 and instigates branch B 130. Return B 150 is thread B 140's return address to which thread A branches. Register X 120 and register Y 160 may be stored on a volatile storage area, such as internal memory.

Thread B 140 executes its instructions, and encounters a prolonged instruction. Thread B 140 begins executing the prolonged instruction, and identifies its next instruction as either a BISL or a BISLED instruction. As such, thread B 140 stores a return address (i.e. return B 150) in register Y 160 that corresponds to the location at which to resume processing when control is passed back to thread B 140. Thread B 140 retrieves return A 110 from register X 120 and branches (i.e. branch A 170) to thread A 100 using return A 110. This cyclical loop continues between thread A 100 and thread B 140 in order to hide memory latency that both threads encounter when they perform a prolonged instruction.

BISL and BISLED instructions may be inserted into a software program either manually or automatically. For example, when a developer is writing a program in machine code, the developer may manually insert BISL and BISLED instructions after prolonged instructions. In another example, when a developer is writing a program in a high-level programming language, a compiler may automatically insert BISL and BISLED instructions for particular co-routines.

Figure 2A:
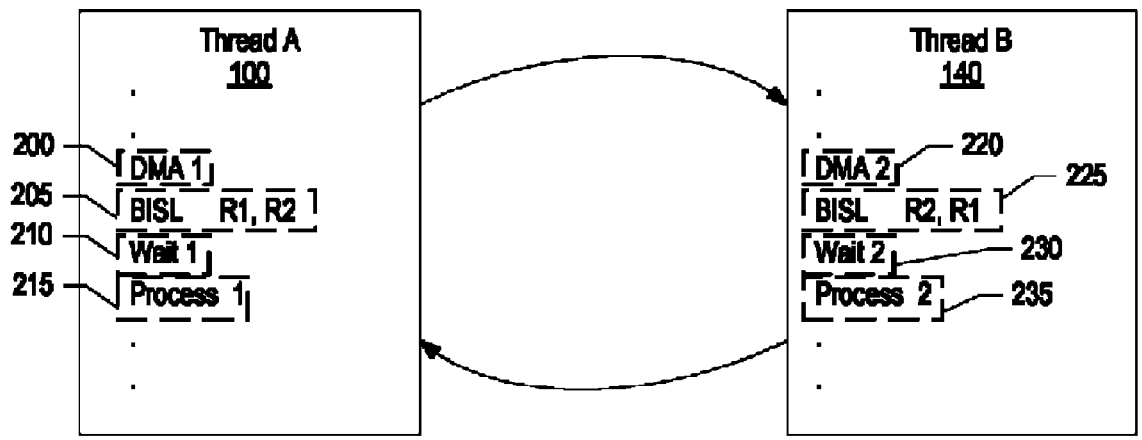
FIG. 2A is a diagram showing two threads that include a branch indirect and set link instruction (BISL)

FIG. 2A is a diagram showing two threads that include a branch indirect and set link instruction (BISL). Thread A 100 and thread B 140 are the same as that shown in FIG. 1, and both include a BISL instruction in order to hide memory latency when the two threads execute a prolonged instruction. Using a BISL instruction, a first thread passes control to a second thread while the first thread processes a prolonged instruction. When control is passed back to the first thread, the first thread waits until the prolonged instruction finishes, and then continues to execute the first thread's instructions.

Thread A 100 includes code lines 200 through 215. Thread A 100 executes a prolonged instruction (i.e. DMA 1) at code line 200. Code line 205 includes a BISL instruction whereby thread A 100 stores a return address in register "R2" which corresponds to the next code line (i.e. code line 210). In addition, thread A 100 retrieves a "branch to" address from register "R1." At this point, control is passed to thread B 140 until thread B 140 encounters a branch instruction.

Thread B 140 includes code lines 220 through 235. When control is passed to thread B 140, thread B begins execution of its instructions. Thread B 140 arrives at code line 220, which is a prolonged instruction, and begins executing the prolonged instruction. Code line 225 includes a BISL instruction whereby thread B 140 stores a return address in register "R1" and retrieves a "branch to" address from register "R2." The branch to address in R2 is the return address in which thread A 100 previously stored (see above).

Control is passed to thread A 100 whereupon thread A 100 executes code lines 210, 215, and so on. When thread A 100 encounters another branch instruction, control is passed to thread B 140 whereupon thread B 140 executes code lines 230, 235, and so on.

Figure 2B:
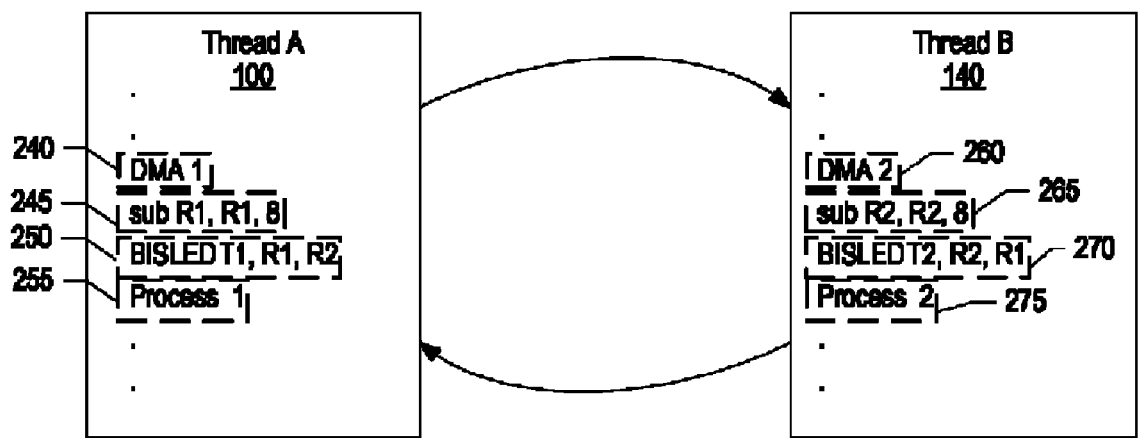
FIG. 2B is a diagram showing two threads that include a branch indirect and set link if external data instruction (BISLED)

FIG. 2B is a diagram showing two threads that include a branch indirect and set link if external data instruction (BISLED). Thread A 100 and thread B 140 are the same as that shown in FIG. 1, and both include a BISLED instruction in order to hide memory latency when the two threads execute a prolonged instruction. A BISLED instruction differs from a BISL instruction (see FIG. 2A) in that when processing returns to the BISLED instruction, the prolonged condition is checked once again to determine if it has completed. If the prolonged instruction is not complete, the thread continues to pass control away to another thread until the prolonged instruction is complete.

Thread A 100 includes code lines 240 through 255. Thread A 100 executes a prolonged instruction (i.e. DMA 1) at code line 240. At code line 245, processing subtracts eight bytes from a return value corresponding to thread B 140 such that when control is passed back to thread B 140, a condition is checked again by thread B 140's BISLED instruction. Code line 250 includes a BISLED instruction that includes an external condition tag "T1", a return address "R2", and a branch to address "R1". Thread A 100 stores the return address in register "R2" which corresponds to code line 255. Thread B 140, however, will modify this value by subtracting two instructions (code line 265) such that when control is passed back to thread A 100, thread A 100 will start at code line 245. Therefore, when control is passed back to thread A 100, the BISLED instruction on code line 250 checks external condition tag "T1" which indicates whether the prolonged instruction is complete. If the prolonged instruction is not complete, thread A 100 passes control back to thread B 140. If the prolonged instruction is complete, thread A 100 continues instruction execution (i.e. code line 255). Thread A 100 retrieves a "branch to" address from register "R1" and passes control to thread B 140.

Thread B 140 includes code lines 260 through 275. When control is passed to thread B 140, thread B starts to execute its instructions. Thread B 140 arrives at code line 260, which is a prolonged instruction. At code line 265, processing subtracts eight bytes from a return value corresponding to thread A 100 such that when control is passed back to thread A 100, a condition is checked again by thread A 100's BISLED instruction (code line 250).

Code line 270 includes a BISLED instruction that includes an external condition tag "T2", a return address "R1", and a branch to address "R2". Thread B 140 stores the return address in register "R1" which corresponds to code line 275. Thread A 100, however, modifies this value by subtracting two instructions (code line 245) such that when control is passed back to thread B 140, thread B 140 starts processing at code line 265. In turn, the BISLED instruction in code line 270 checks external condition tag "T2" which indicates whether the prolonged instruction is complete. If the prolonged instruction is not complete, thread B 140 passes control back to thread A 100. If the prolonged instruction is complete, thread B 140 continues instruction execution (i.e. code line 275).

Figure 3:
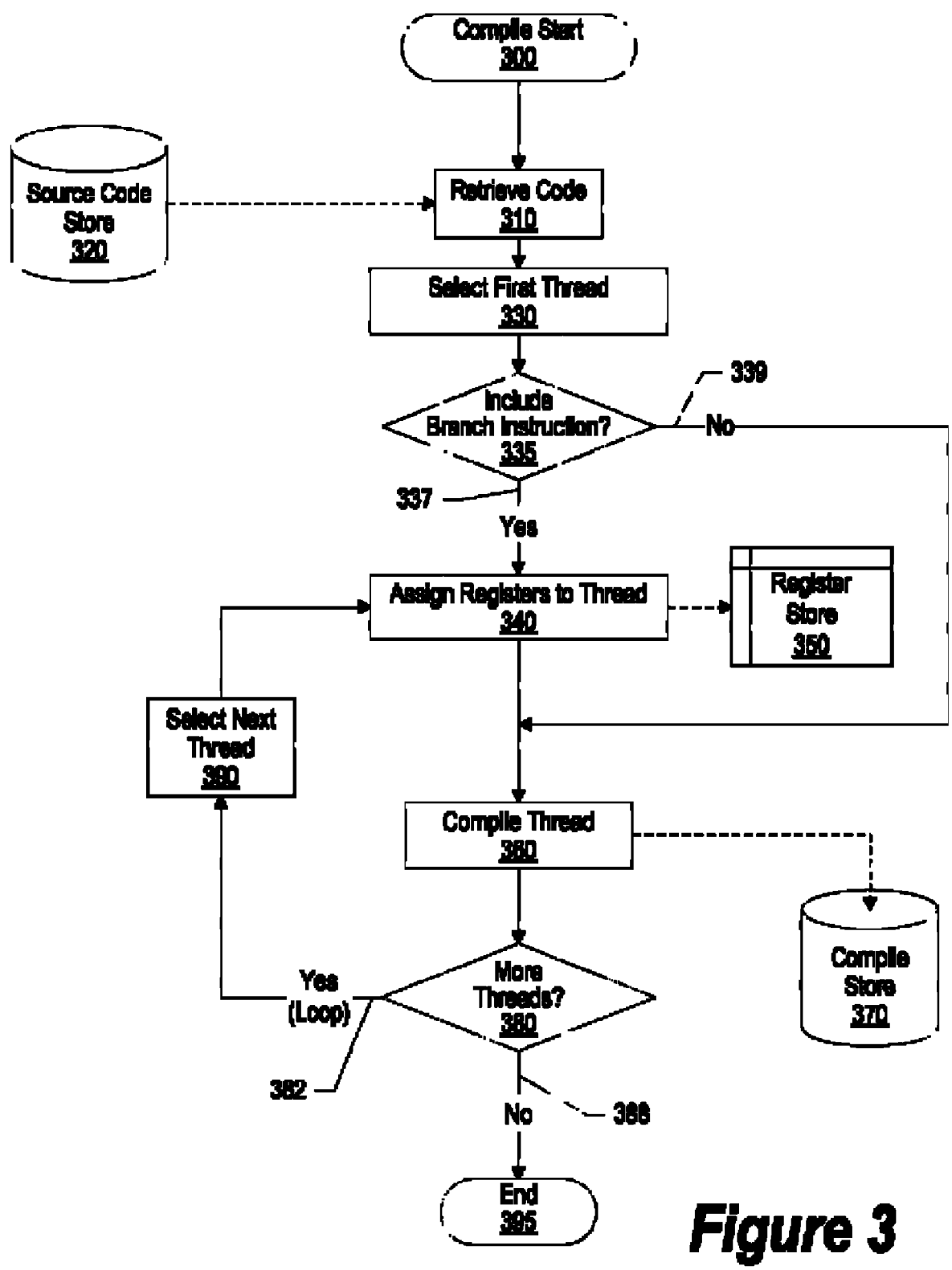
FIG. 3 is flowchart showing steps taken in compiling threads and assigning registers to the threads that include branch instructions.

FIG. 3 is flowchart showing steps taken in compiling threads and assigning registers to the threads that include Branch Indirect and Set Link (BISL) and/or Branch Indirect and Set Link if External Data (BISLED) instructions. At compile BISL and/or BISLED instructions are inserted in code at places that correspond to a particular thread's prolonged instructions. BISL and BISLED instructions may be inserted into a software program either manually or automatically. For example, when a developer is writing a program in machine code, the developer may manually insert BISL and BISLED instructions after prolonged instructions. In another example, when a developer is writing a program in a high-level programming language, a compiler may automatically insert BISL and BISLED instructions for particular co-routines. The BISL and BISLED instructions cause a first thread to branch to a second thread while the first thread's prolonged instruction executes. For example, a BISL instruction may be placed after a thread's DMA instruction whereby processing branches to a different thread while the DMA instruction executes.

Compile processing commences at 300, whereupon processing retrieves source code from source code store 320 at step 310. Source code store 320 may be stored on a nonvolatile storage area, such as a computer hard drive. At step 330, processing selects a first thread that is included in the source code. A determination is made as to whether the thread includes a BISL or a BISLED instruction (decision 335).

If the thread includes a BISL or a BISLED instruction, decision 330 branches to "Yes" branch 337 whereupon processing assigns a plurality of registers located in register store 350 to the thread (step 340). The thread uses one of the plurality of registers to store a return address and uses another one of the plurality of registers to identify an address location to branch to a second thread. For example, when a first thread encounters a BISL or a BISLED instruction, the first thread stores a return address in one of its assigned registers, and then retrieves an address from another one of its registers that corresponds to a target address of a second thread (see FIGS. 1, 2A, 2B, 4, and corresponding text for further details regarding thread branching).

On the other hand, if the selected thread does not include a BISL or a BISLED instruction, decision 335 branches to "No" branch 339 bypassing register assigning steps. At step 360, processing compiles the thread and stores the compiled code in compile store 370. Compile store 370 may be stored on a nonvolatile storage area, such as a computer hard drive.

A determination is made as to whether there are more threads in the source code to compile (decision 380). If there are more threads in the source code to compile, decision 380 branches to "Yes" branch 382 which loops back to select (step 390) and process a next thread. This looping continues until there are no more threads to compile, at which point decision 380 branches to "No" branch 388 whereupon compile processing ends at 395.

Figure 4:
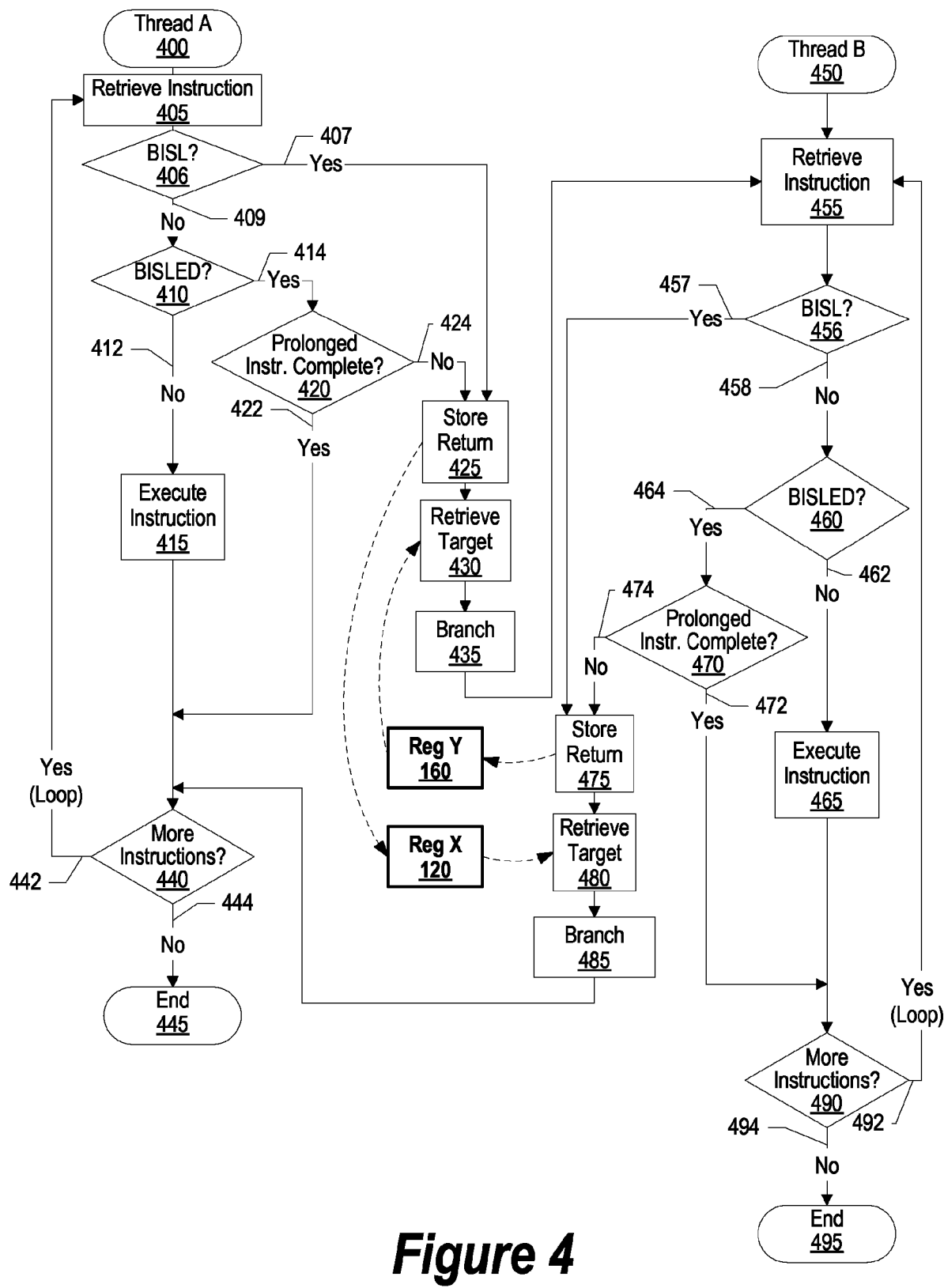
FIG. 4 is a flowchart showing steps taken in two threads branching to each other when the threads encounter a prolonged instruction.

FIG. 4 is a flowchart showing steps taken in two threads branching to each other when the threads encounter a prolonged instruction. Thread A processing commences at 400, whereupon processing retrieves an instruction at step 405. A determination is made as to whether the instruction is a Branch Indirect and Set Link (BISL) instruction (decision 406). If the instruction is a BISL instruction, decision 406 branches to "Yes" branch 407 whereupon processing begins steps to branch to thread B (see below).

On the other hand, if the instruction is not a BISL instruction, decision 406 branches to "No" branch 409 whereupon a determination is made as to whether the instruction is a Branch Indirect and Set Link if External Data (BISLED) instruction (decision 410). If the instruction is not a BISLED instruction, decision 410 branches to "No" branch 412 whereupon processing executes the instruction at step 415. On the other hand, if the instruction is a BISLED instruction, decision 410 branches to "Yes" branch 414 whereupon a determination is made as to whether a prolonged instruction prior to the branch instruction is complete (decision 420). For example, a prolonged instruction may be a DMA instruction, and processing determines whether the DMA instruction is complete. If the prolonged instruction is complete, decision 420 branches to "Yes" branch 422 whereupon thread A maintains control and continues processing.

On the other hand, if the prolonged instruction is not complete, decision 420 branches to "No" branch 424 whereupon processing stores thread A's return address in register X 120 (step 425). Register X 120 is the same as that shown in FIG. 1. Processing retrieves a target address from register Y 160 at step 430. The target address is the address for which thread A should branch to thread B. The target address was stored in register Y 160 when thread B branched to thread A. At step 435, processing branches and passes control to thread B. Register Y 160 is the same as that shown in FIG. 1.

Thread B processing commences at 450, whereupon processing retrieves an instruction at step 455. A determination is made as to whether the instruction is a BISL instruction (decision 456). If the instruction is a BISL instruction, decision 456 branches to "Yes" branch 456 whereupon processing begins steps to branch back to thread A (see below). On the other hand, if the instruction is not a BISL instruction, decision 456 branches to "No" branch 458 whereupon a determination is made as to whether the instruction is a Branch Indirect and Set Link if External Data (BISLED) instruction (decision 460).

If the instruction is not a BISLED instruction, decision 460 branches to "No" branch 462 whereupon processing executes the instruction at step 465. On the other hand, if the instruction is a BISLED instruction, decision 460 branches to "Yes" branch 464 whereupon a determination is made as to whether a prolonged instruction prior to the branch instruction is complete (decision 470). For example, a prolonged instruction may be a DMA instruction, and processing determines whether the DMA instruction is complete. If the prolonged instruction is complete, decision 470 branches to "Yes" branch 472 whereupon thread B maintains control and continues processing.

On the other hand, if the prolonged instruction is not complete, decision 470 branches to "No" branch 474 whereupon processing stores thread B's return address in register Y 160 (step 475). Processing retrieves a target address from register X 120 at step 480 which is the return address that thread A previously stored (see above). At step 485, processing branches to thread A's return address and passes control to thread A.

A determination is made as to whether thread A has more instructions to execute (decision 440). If thread A has more instructions to execute, decision 440 branches to "Yes" branch 442 whereupon processing executes the next instruction. This looping continues until thread A has no more instructions to execute, at which point decision 440 branches to "No" branch 444 whereupon thread A ends at 445.

Likewise, a determination is made as to whether thread B has more instructions to execute (decision 490). If thread B has more instructions to execute, decision 490 branches to "Yes" branch 492 whereupon processing executes the next instruction. This looping continues until thread B has no more instructions to execute, at which point decision 490 branches to "No" branch 494 whereupon thread B ends at 495.

Figure 5:
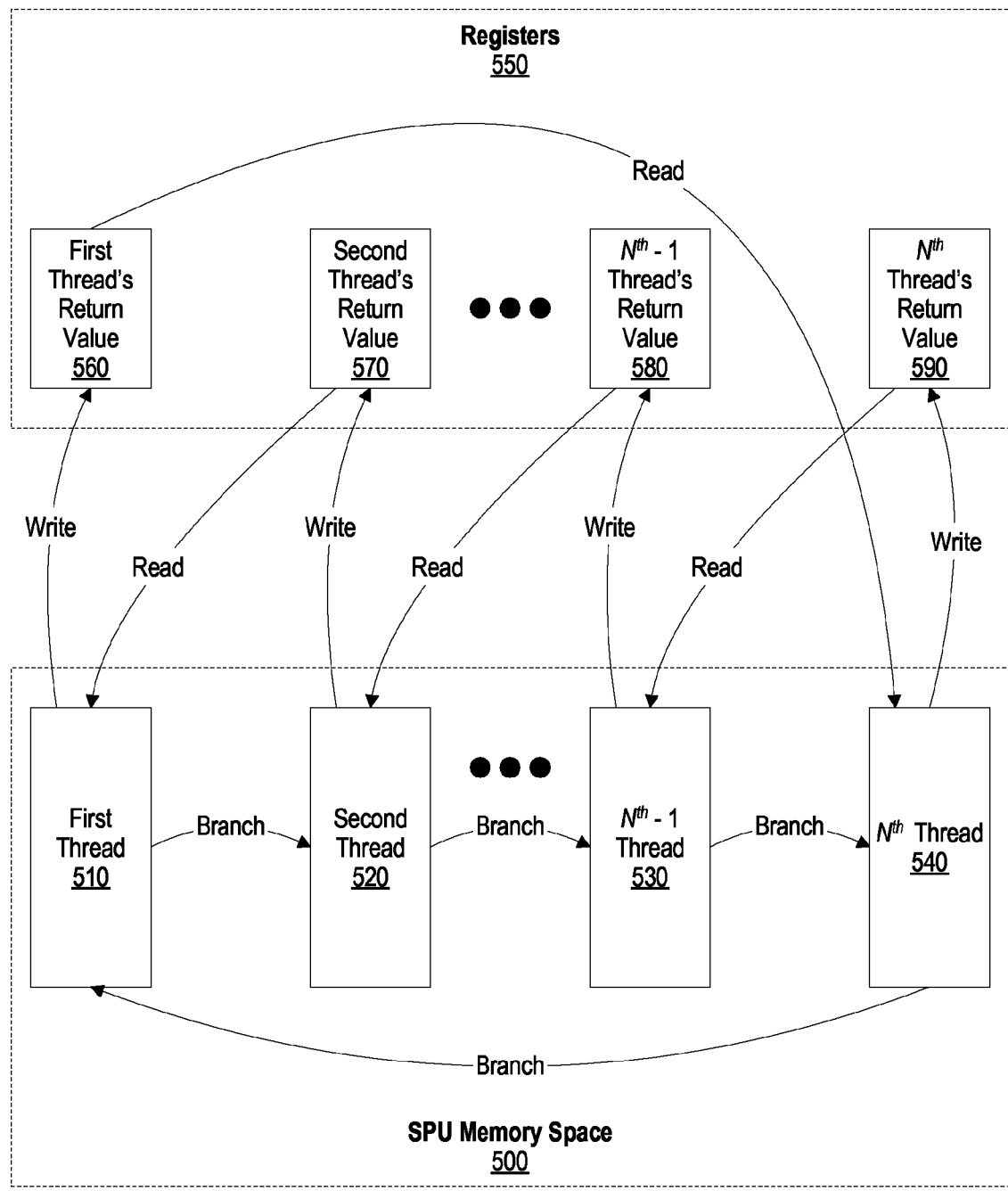
FIG. 5 is a diagram showing multiple threads branching to one another when a thread reaches a prolonged instruction.

FIG. 5 is a diagram showing multiple threads branching to one another when a thread reaches a prolonged instruction. SPU Memory space 500 is a common memory space with a number of threads (510, 520, 530, through $N^{th}$ thread 540). When a thread reaches a prolonged instruction, it branches to another thread. In one embodiment, the threads branch in a round-robin fashion with first thread 510 branching to second thread 520 and so on until the last thread ($N^{th}$ thread 540) branches back to first thread 510.

Registers 550 are used to store each thread's return value (register 560 stores the return value for first thread 510, register 570 stores the return value for second thread 520, second to last register 580 stores the return value for second to last thread 530, and last register 590 stores the return value for last thread 540). When a thread reaches a prolonged instruction, such as a DMA instruction, it writes the address where it wishes to be returned to its register and reads the return value for the next thread in the loop. For example, when first thread 510 encounters a prolonged instruction, it writes the address where it wishes to resume to register 560 and reads the second thread's return value from register 570. Then it branches to the second thread's return value (somewhere in second thread 520) so that second thread 520 can execute while first thread 510 is waiting for the prolonged instruction to complete. An indirect segmented register file is used to map the physical registers into logical groups. In a system with 128 physical registers, each of the threads could be allocated an equal number of registers (i.e., if there are four threads, each would be allocated 32 registers). The indirect segmented register file allows each thread to seemingly branch to the same register (i.e., R2) when the register is actually different for each of the threads (i.e., R2 might be real (hardware) register 2 for the first thread, but R2 might be real register 34 for the second thread). Using an indirect segmented register file allows the registers to be dynamically changed when one of the threads completes. For example, when thread 2 completes, the "branch to" register used by thread 1 would be changed to point to the hardware register used by thread 3's "return" register. In other words, even though thread 1 would seemingly branch to the same logical register (i.e., "R2"), because of re-mapping, the actual (hardware) register to which the logical register is mapped would be changed so that thread 1 now branches to thread 3. For more details regarding the indirect segmented register file, see FIGS. 11A-11C.

Figure 6A:
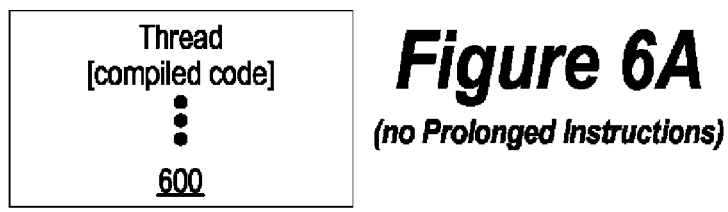
FIG. 6A is a diagram showing a single thread resulting from code that includes no prolonged instructions.

FIG. 6A is a diagram showing a single thread resulting from code that includes no prolonged instructions. Because the source code did not include any prolonged instructions, the compiler created single thread 600 for execution.

Figure 6B:
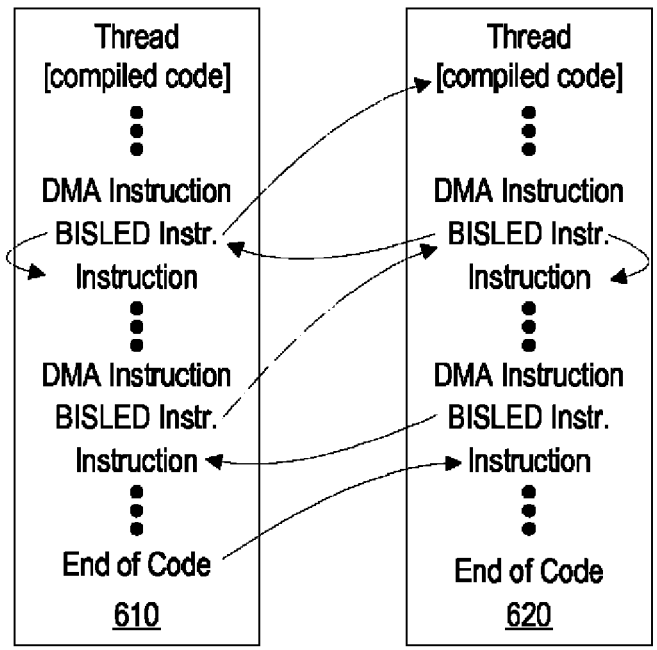
FIG. 6B is a diagram showing two threads resulting from code that includes a small amount of prolonged instructions.

FIG. 6B is a diagram showing two threads resulting from code that includes a small amount of prolonged instructions. In this example, the compiler determined that, because some prolonged instructions were found, two threads would suffice (thread 610 and thread 620). When thread 610 encounters a prolonged instruction it branches to thread 620 and when thread 620 encounters a prolonged instruction, it branches back to thread 610. If both threads are concurrently waiting for prolonged instructions, then processing branches back and forth between the threads until one of the prolonged instructions completes, at which point the thread with the prolonged instruction that completes first resumes execution.

Figure 6C:
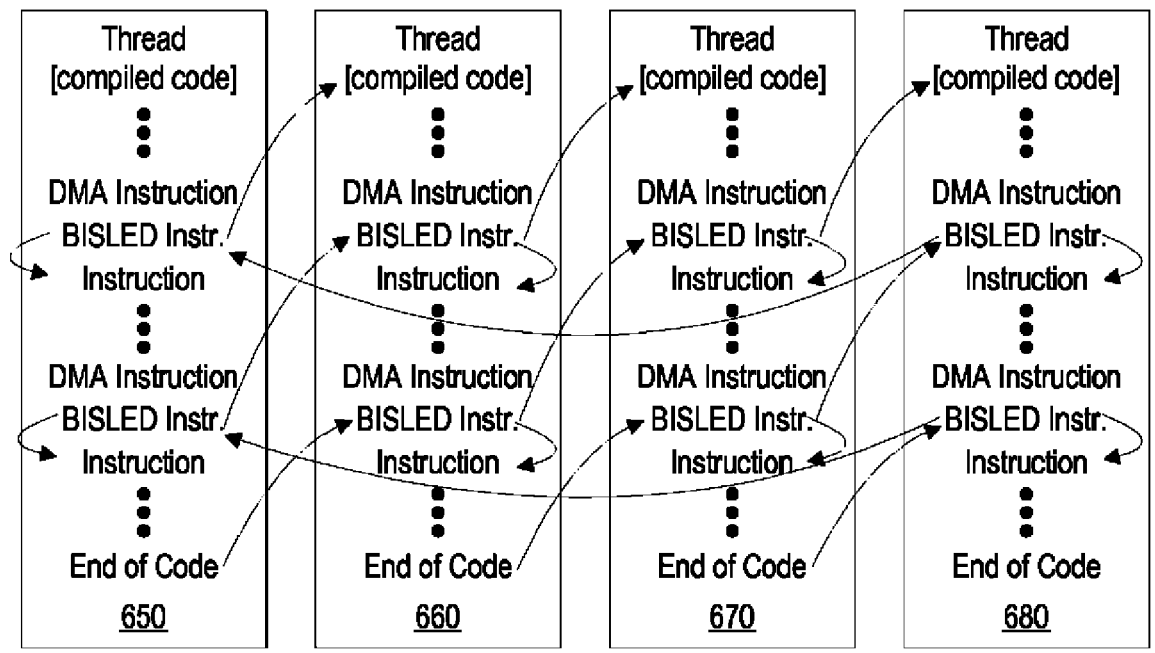
FIG. 6C is a diagram showing four thread resulting from code that includes more prolonged instructions.

FIG. 6C is a diagram showing four thread resulting from code that includes more prolonged instructions. In this example, the compiler has created four threads after determining that four threads are more efficient in light of the prolonged instructions found in the source code. Threads 650, 660, 670, and 680 are created and execution begins with thread 650. When thread 650 encounters a prolonged instruction, it conditionally branches to thread 660. When thread 660 encounters a prolonged instruction, it conditionally branches to thread 670. Likewise, when thread 670 encounters a prolonged instruction, it conditionally branches to thread 680. Finally, when thread 680 encounters a prolonged instruction, it conditionally branches back to thread 650.

When control is transferred back to a thread that has already commenced (i.e., a thread that is not resuming at the beginning), the "return" value for the thread is somewhere at or before the conditional branch (BISLED) instruction from which the thread previously branched. In this manner, if a thread resumes control but the prolonged instruction has not yet completed, it immediately branches to the next thread. Similarly to the two thread situation described in FIG. 6B, if all threads are concurrently waiting for their respective prolonged instructions to complete, then control immediately passes from one thread to the next until one of the prolonged instructions completes. When control is passed to the thread with a prolonged instruction that has completed, then that thread resumes execution until another prolonged instruction is reached or until the end of the thread's code.

Figure 7:
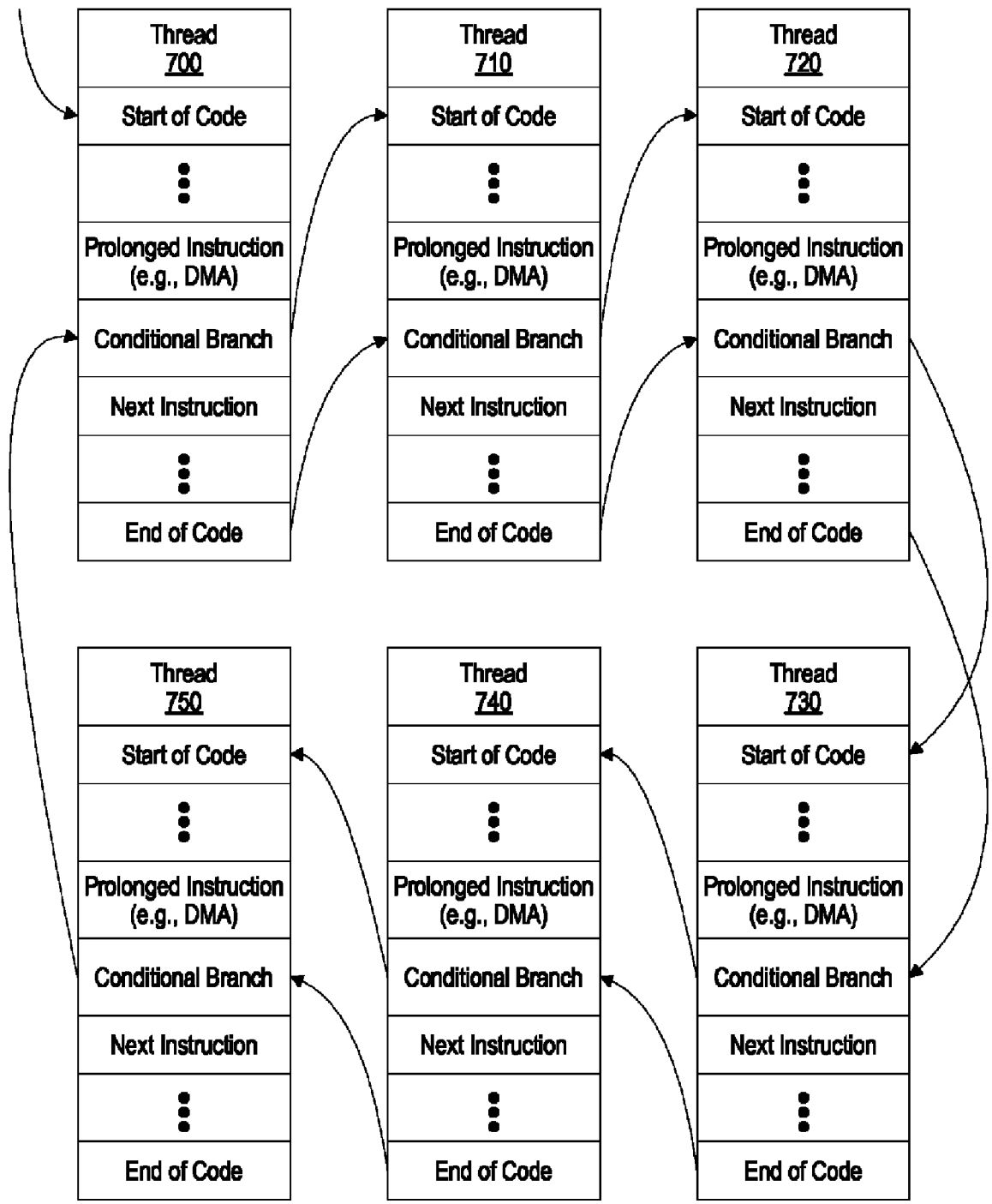
FIG. 7 is a diagram showing six threads resulting from code that includes six prolonged (DMA) instructions.

FIG. 7 is a diagram showing six threads resulting from code that includes six prolonged (DMA) instructions. This diagram is similar to the diagram shown in FIG. 6C with additional detail provided. Six threads are shown (Threads 700, 710, 720, 730, 740, and 750). Processing commences at the beginning of thread 700. Thread 700 is executed until a prolonged instruction, such as a DMA request, is encountered. After the prolonged instruction, a conditional branch instruction is executed. In the unlikely event that the prolonged instruction completed almost immediately, then processing falls through to the next instruction of thread 700. More likely, however, is that the prolonged instruction is not completed so thread 700 branches to thread 710 using a register value. Initially, the register value corresponding to each of the threads (710 through 750) points to the start of the respective thread. The next thread, in this case thread 710, commences and runs until it encounters a prolonged instruction at which point a conditional branch instruction likely branches to the next thread (thread 720). At some point, one of the threads, such as thread 750, branches back to thread 700 which had previously branched to thread 710. Thread 700 resumes at a point at or before its conditional branch instruction. If the prolonged instruction has completed, thread 700 continues execution (i.e., falls through to the "next instruction"). However, if the prolonged instruction has not yet completed, then thread 700 branches once again to the next thread in the chain (i.e., thread 710). This continues until each thread has completed. When a thread completes, mapping in the indirect segmented register file is dynamically altered so that the completed thread is bypassed (i.e., thread 700's conditional branch would branch to thread 720, rather than thread 710, when thread 710 completes). See FIGS. 11A-11C for more details regarding the indirect segmented register file. The last thread determines it is the last thread in the circuit because its "branch to" and "return" registers have the same value.

Figure 8:
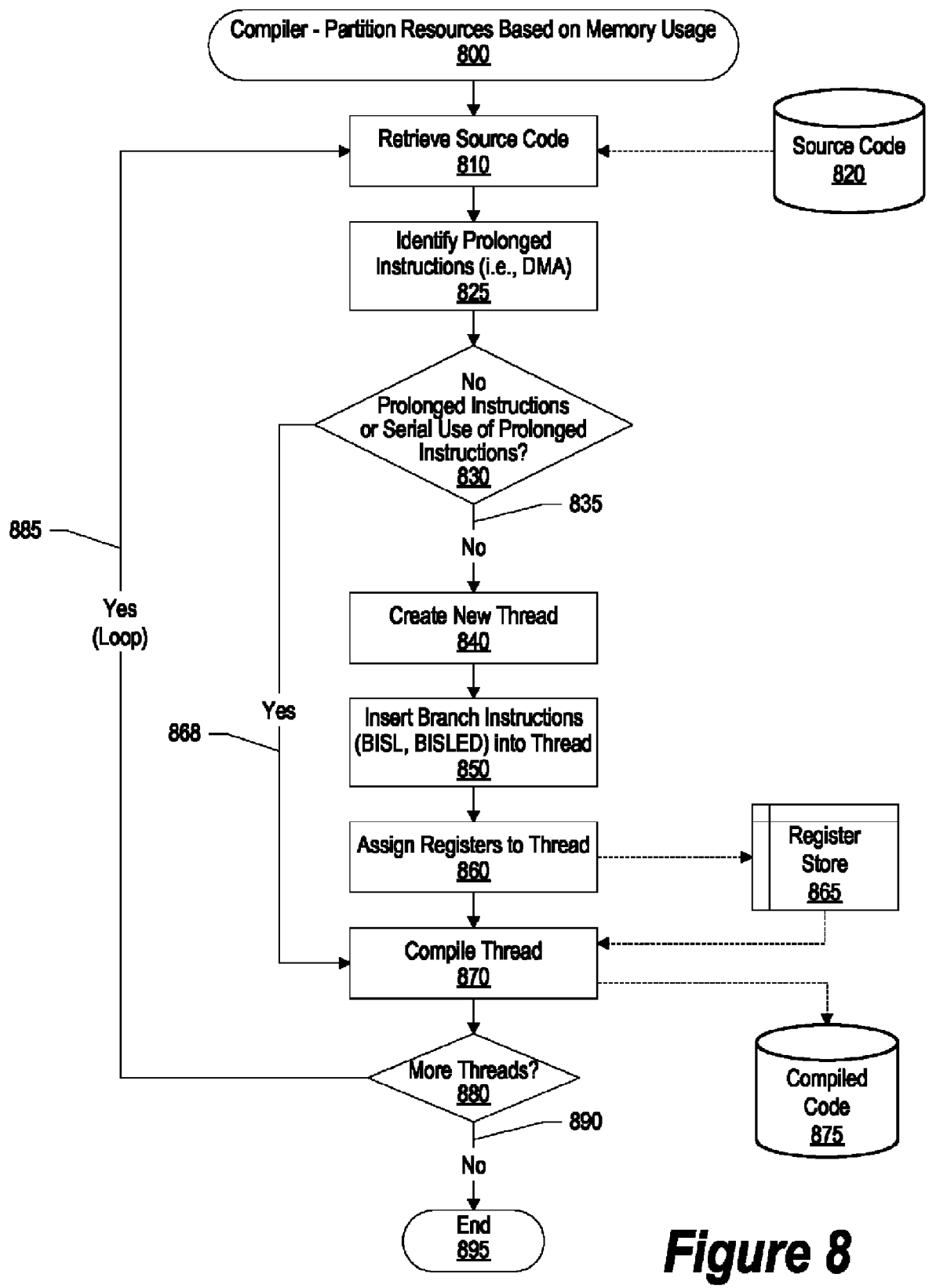
FIG. 8 is a flowchart showing steps taken by a compiler to compile source code based upon memory usage.

FIG. 8 is a flowchart showing steps taken by a compiler to compile source code based upon memory usage. Processing commences at 800 whereupon, at step 810, the compiler reads source code 820. At step 825, the compiler identifies any prolonged instructions, such as DMA commands. A determination is made as to whether there are no prolonged instructions identified or whether the prolonged instructions are used serially (decision 830). A serial use of prolonged instructions is where a subsequent prolonged instruction is based upon a value determined by a previous prolonged instruction. For example, if a first DMA command reads in addresses of graphics data and a second DMA command reads in the graphics data based on the addresses, then the second DMA command cannot commence until the addresses needed are read by the first DMA command.

If there are prolonged instructions that are not serially dependent on one another, decision 830 branches to "no" branch 835 to create a new thread. A new thread is created by the compiler at step 840. At step 850, a conditional branch instruction (BISLED) is inserted into the thread so that it is executed after the prolonged instruction and conditionally branches to an address obtained from a register (e.g., R2). The register used in the conditional branch is a logical register that is mapped to a real (hardware) register using an indirect segmented register file. In this manner, when one thread completes, the indirect segmented register file is updated so that the logical register maps to a different hardware register in order to bypass the thread that has completed.

At step 860, the registers are assigned to register store 865. Register store 865 is used to keep track of the number of real (hardware) registers needed to map to the various logical registers. The initial mapping for branching from one thread to another is also set in register store 865. As previously mentioned, when one of the threads completes, the initial mapping set in register store 865 is dynamically altered in order to bypass the thread that has completed. At step 870, the thread is compiled and stored in compiled code 875.

Returning to decision 830, if there are no prolonged instructions or the prolonged instructions are serially dependent on one another, decision 830 branches to "yes" branch 838 bypassing the creation of a new thread and the code is compiled at 870. If a new thread was created (i.e., decision 830 branching to "no" branch 835), then a determination is made that the new thread needs to be processed to see if it has prolonged instructions that can be put into a new thread (decision 880). If there is a new thread, decision 880 branches to "yes" branch 885 which loops back to process the remaining code. This looping continues until there are no new threads, at which point decision 880 branches to "no" branch 890 and processing commences at 895.

Figure 9:
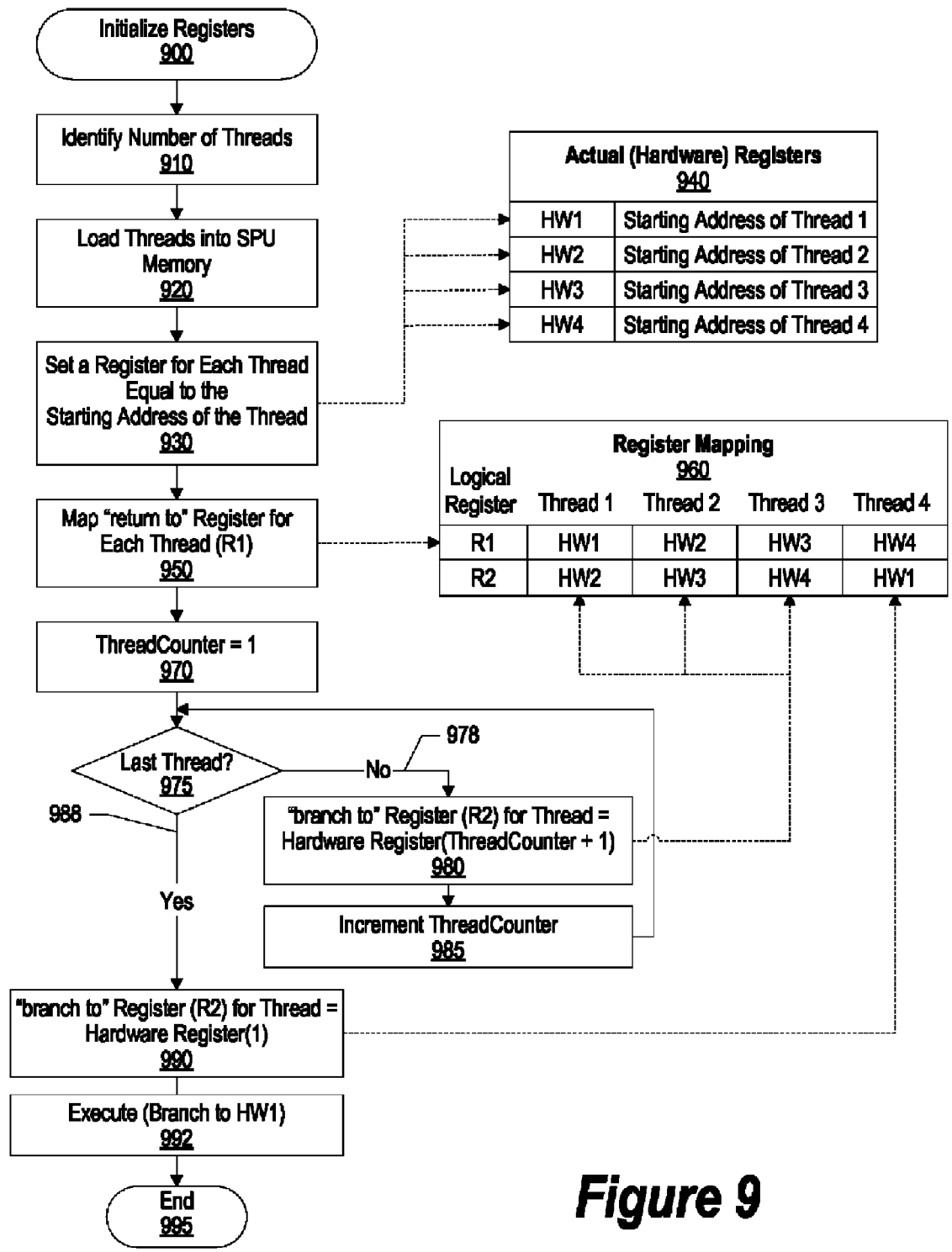
FIG. 9 is a flowchart showing steps taken in initializing registers for the various threads.

FIG. 9 is a flowchart showing steps taken in initializing registers for the various threads. Processing commences at 900 whereupon, at step 910, the number of threads in the compiled code is identified. Each thread uses a logical register with the same identifier for storing the "return to" value for the thread. In the example shown, each thread uses the logical register "R1" to store its "return to" value. The underlying actual (hardware) register corresponding to the logical registers is different, however. Likewise, each thread uses a logical register with the same identifier to read the "branch to" value for the next thread in the series. In the example shown, each thread uses the logical register "R2" to retrieve the "branch to" value for the next thread. Of course, the "return to" value of one thread is the "branch to" thread of another thread. Referring to register mapping table 960, the "return to" (R1) value for thread 2 is real (hardware) register HW2. Likewise, because thread 1 initially branches to thread 2, the "branch to" (R2) value for thread 1 is also HW2.

At step 920, the various threads are loaded into the available memory space for the processor, such as the SPU. After loading the threads, each thread has a starting address within the processor's address space. At step 930, hardware registers 940 are initialized so that one of the registers is equal to the starting address of one of the threads. In the example shown, there are four threads so there are four hardware addresses (HW1 through HW4). At step 950, the "return to" registers (R1) for each of the threads is initialized and mapped in indirect segmented register file 960 to the hardware register used to store the respective thread's starting address. In the example shown, thread 1's "return to" register is set as being HW1, thread 2's "return to" register is set as being HW2, thread 3's "return to" register is set as being HW3, and thread 4's "return to" register is set as being HW4.

At step 970, a counter is initialized to one. A determination is made as to whether the last thread is being processed (decision 975). If the last thread is not being processed, decision 975 branches to "no" branch 978 whereupon the "branch to" (R2) logical register is initialized to be the next hardware register (step 985). In other words, thread 1's "branch to" register points to HW2 (the register that stores thread 2's "return to" register value). Likewise, thread 2's "branch to" register points to HW3 and thread 3's "branch to" register points to HW4. After the "branch to" register is initialized for a given thread, the counter is incremented at step 985 and processing loops back to process the next thread. This looping continues until the counter is equal to the last thread, whereupon decision 975 branches to "yes" branch 988. In the example shown, the last thread is reached when the counter is equal to four. Now, the last thread's "branch to" register is set as being the "return to" register value of the first thread (step 990). In the example shown, thread 4's "branch to" register points to HW1, which is the hardware register in the mapping table where thread 1 stores its "return to" address.

When all hardware registers 940 have been initialized and logical mapping 960 has been initialized for each threads' "return to" and "branch to" registers, then processing of the threads commences by branching to the start of one of the threads (i.e., HW1 which is the starting address of thread 1). Register initialization thereafter ends at 995.

Figure 10:
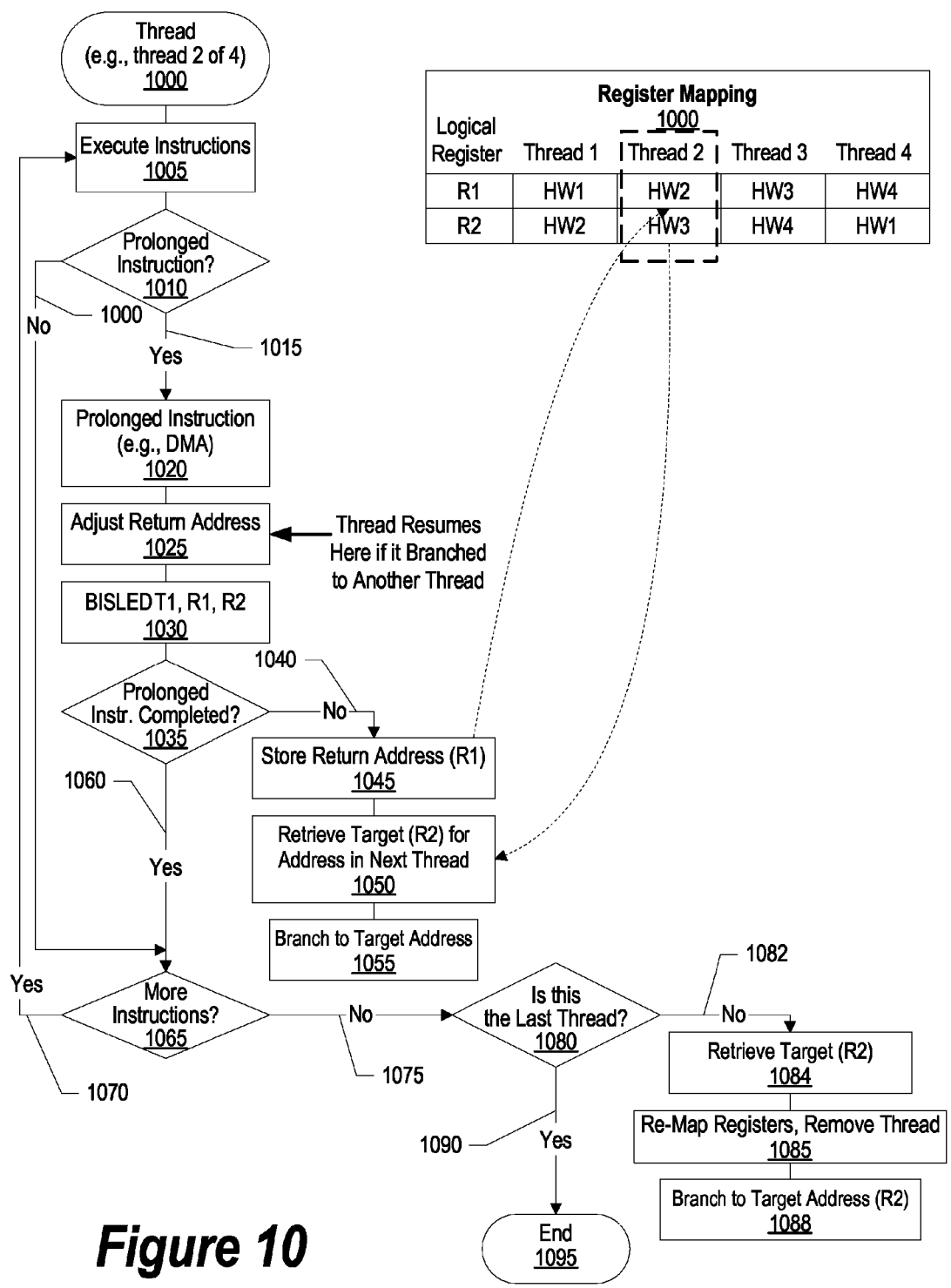
FIG. 10 is a flowchart showing steps taken by a thread when executing to branch to another thread when a prolonged instruction is encountered.

FIG. 10 is a flowchart showing steps taken by a thread when executing to branch to another thread when a prolonged instruction is encountered. Processing commences at 1000. In the example shown, the steps used to execute portions of thread 2 of four is being shown. When the thread (i.e., thread 2) receives control, it executes instructions (step 1005). A determination is made as to whether a prolonged instruction, such as a DMA instruction, has been executed (decision 1010). If a prolonged instruction has been executed, decision 1010 branches to "yes" 1015 whereupon statements inserted by the compiler are executed. First, the prolonged instruction, such as a DMA instruction, is executed (step 1020). In one embodiment, the return address value (R1) is adjusted at step 1025 (see FIG. 2, reference element 245 and corresponding text for a description of the adjustment that is made in this embodiment). At step 1030, a conditional branch (BISLED) instruction is executed. As a conditional branch instruction, the BISLED instruction only branches to the "branch to" address if the prolonged instruction has not yet completed.

Steps 1035 through 1055 detail the steps taken during execution of the conditional branch instruction. A determination is made as to whether the prolonged instruction has completed (decision 1035). If the prolonged instruction has not yet completed, decision 1035 branches to "no" branch 1040 whereupon, at step 1045, the adjusted return address value is stored in the threads "return to" logical register (R1). Note that the address is actually stored in hardware register HW2 and that thread 1's "branch to" register is mapped as being HW2 so that when thread 1 branches, it will branch to the "return to" address of thread 2. At step 1050, the target "branch to" address is retrieved from logical register R2. This logical register is mapped to actual register HW3 which corresponds with thread 3's "return to" address. At step 1055, processing branches to the target address (R2 which is the "return to" address for thread 3). When another thread, such as thread 1, eventually branches back to this thread, processing will commence, in one embodiment, at 1025, where thread 2 will once again execute the conditional branch (BISLED) instruction at step 1030 to determine whether the prolonged instruction has completed. If the prolonged instruction has not yet completed, thread 2 will branch to the next thread (i.e., thread 3), and will continue branching to the next thread (R2, the "branch to" address), until the prolonged instruction is complete. When the prolonged instruction is complete, decision 1035 branches to "yes" branch 1060.

A determination is made as to whether there are more instructions for the thread to execute (decision 1065). If there are more instructions to execute, decision 1065 branches to "yes" branch 1070 which loops back to execute the instructions and process any prolonged instructions as described above. This continues until there are no more instructions for the thread to execute, at which time decision 1065 branches to "no" 1075.

A determination is made as to whether this is the last thread in the group of threads that is still executing (decision 1080). One way this determination can be made is if the "return to" (R1) and "branch to" (R2) registers have the same address (i.e., both pointing to this thread). If this thread is not the last thread to complete, decision 1080 branches to "no" branch 1082 whereupon, at step 1084, the target ("branch to") address is retrieved that points at the next thread. At step 1085, the logical registers are dynamically remapped to remove this thread from the mapping table. For more details regarding the remapping of the mapping table to remove a thread, see FIG. 11C and the corresponding description. Finally, at step 1088, the thread branches to the target address that was retrieved in step 1084. Because this thread has been removed from the mapping table, it will not be resumed by any of the other threads. Returning to decision 1080, if this thread is the last thread to complete, then decision 1080 branches to "yes" branch 1090 whereupon processing ends at 1095. In one embodiment, a signal is sent prior to ending in order to notify a scheduler or some other process that the processing on the SPU has completed.

FIGS. 11A-11C show the use of hardware and logical registers that facilitate the branching of threads from one another. FIG. 11A is a diagram showing an indirect segmented register file to provide each thread with logical registers that are mapped to physical (hardware) registers. In this example, hardware registers 1110 include 128 individual hardware registers (PR1 through PR128). These hardware registers are logically allocated to the various threads using segmented register file 1120. In the example shown, each thread is allocated an equal number of registers. Because there are eight threads, each of the threads is allocated 16 registers. If an equal allocation is used and there are only four threads, then each thread would be allocated 32 registers. Likewise, if equal allocation is used and there are sixteen threads, then each thread would be allocated eight registers. This flexibility allows the compiler to recompile threads at anytime in order to dynamically balance in-flight DMA memory requests. If there are more DMA memory requests, more threads are created (see FIG. 8 and the corresponding description for one embodiment of dynamically compiling code into a number of threads based upon the extent of in-flight DMA memory requests). Conversely, if there are fewer DMA memory requests, fewer threads are created.

In addition, the compiler can use an unequal distribution of registers based upon the computational needs of a specific thread. For example, a computationally bound thread could be compiled to use more registers. In the example shown, if only seven threads are needed for balancing the DMA memory requests, then one of the threads that is computationally bound could be allocated two groups of registers (32 registers) with the remaining six threads still allocated 16 registers apiece.

FIG. 11B is a diagram showing the mapping of eight hardware registers (physical registers PR1 through PR8) used to control flow between eight threads. Two of the logical registers for each thread are used for controlling the branching from one thread to another. In the example shown in example 1150, eight threads are being used. Consequently, eight of the hardware registers are used to store the "return to" address (one "return to" address for each of the threads). Each thread has a logical "return to" register (i.e., LR1) that it uses to store the address that should be used to resume the thread. Each of the logical "return to" registers is mapped to a different hardware register. In addition, each thread has a logical "branch to" register in which an address within another thread is stored so that when relinquishing control to another thread, the next thread is properly resumed. Of course, one thread's "return to" register is another thread's "branch to" register. So, while there are sixteen logical registers being used in the example (eight "return to" and eight "branch to" registers), there are only eight hardware registers with each hardware register being mapped to both a "return to" and a "branch to" register.

FIG. 11C is a diagram of mapping logical registers to hardware registers and dynamically re-mapping the registers when one of the thread completes. In initial register mapping table 1160, two logical registers (LR1 and LR2) are used for each thread to store the "return to" and "branch to" addresses for the respective threads. In the example, logical register LR1 is used to store a thread's "return to" address, and logical register LR2 is used to store a thread's "branch to" address. Thread 1's "return to" register LR1 maps to hardware register PR1, thread 2's "return to" register R1 maps to hardware register PR2, and so on until finally thread 8's "return to" register LR1 maps to hardware register PR8. Likewise, thread 1's "branch to" register LR2 maps to hardware register PR2, thread 2's "branch to" register LR2 maps to hardware register PR3, until finally thread 8's "branch to" register LR2 maps back to hardware register PR1. In this manner, when thread 1 is about to relinquish control, it writes its "return to" address to LR1 where it is stored in hardware address PR1. Thread 1 also reads its "branch to" address from LR2. Initially, thread 1's "branch to" register LR2 is mapped to PR2 and, consequently, using its LR2 register, thread 1 will branch to thread 2. Looking at the table, control is passed from one thread to another until thread 8 relinquishes control. Thread 8 writes its "return to" address (R1) which is stored in hardware register PR8. However, thread 8's "branch to" address (R2) is mapped to PR1, which is the same register that thread 1 used to write its "return to" address. As a result, thread 8 branches back to thread 1.

When one of the threads completes, the indirect segmented register file is updated to bypass the completed thread. In the example shown in table 1170, thread 2 has completed. When thread 2 completes, one of the logical registers is remapped to bypass thread 2. In particular, thread 1's "branch to" register (that used to be mapped to PR2) is remapped to PR3. Now when thread 1 relinquishes control, it will branch to thread 3 rather than thread 2.

When there is only one thread that has not completed, the thread's "return to" and "branch to" registers will be the same. For example, if thread 1 is the last remaining active thread, both its "return to" and "branch to" logical registers will be mapped to the same hardware register (PR1). When the last thread completes it is able to recognize that there are no more threads to which it can relinquish control and can, at that time, send a signal to an external process (outside the SPU) indicating that the processing on the SPU (i.e., the eight original threads) have completed, making the SPU available for additional work.

Figure 12:
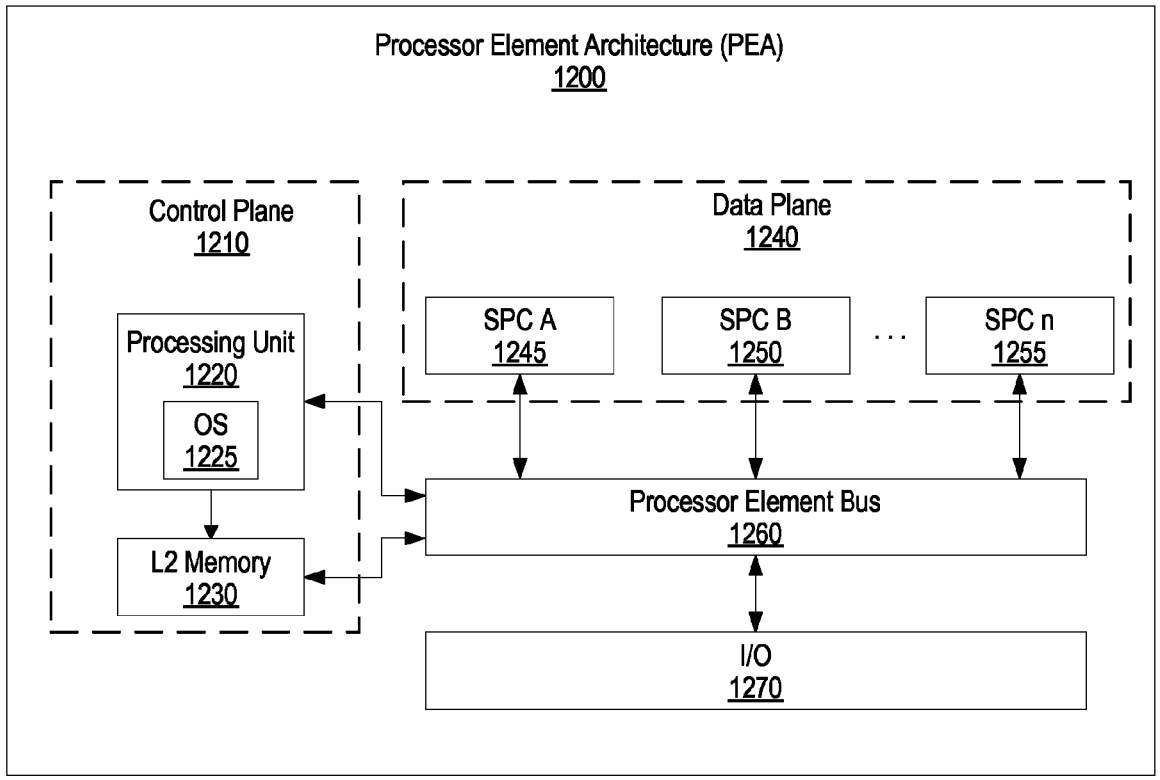
FIG. 12 is a diagram showing a processor element architecture that includes a plurality of heterogeneous processors.

FIG. 12 is a diagram showing a processor element architecture that includes a plurality of heterogeneous processors. The heterogeneous processors share a common memory and a common bus. Processor element architecture (PEA) 1200 sends and receives information to/from external devices through input output 1270, and distributes the information to control plane 1210 and data plane 1240 using processor element bus 1260. Control plane 1210 manages PEA 1200 and distributes work to data plane 1240.

Control plane 1210 includes processing unit 1220 which runs operating system (OS) 1225. For example, processing unit 1220 may be a Power PC core that is embedded in PEA 1200 and OS 1225 may be a Linux operating system. Processing unit 1220 manages a common memory map table for PEA 1200. The memory map table corresponds to memory locations included in PEA 1200, such as L2 memory 1230 as well as non-private memory included in data plane 1240 (see FIG. 13A, 13B, and corresponding text for further details regarding memory mapping).

Data plane 1240 includes Synergistic Processing Complex's (SPC) 1245, 1250, and 1255. Each SPC is used to process data information and each SPC may have different instruction sets. For example, PEA 1200 may be used in a wireless communications system and each SPC may be responsible for separate processing tasks, such as modulation, chip rate processing, encoding, and network interfacing. In another example, each SPC may have identical instruction sets and may be used in parallel to perform operations benefiting from parallel processes. Each SPC includes a synergistic processing unit (SPU) which is a processing core, such as a digital signal processor, a microcontroller, a microprocessor, or a combination of these cores.

SPC 1245, 1250, and 1255 are connected to processor element bus 1260 which passes information between control plane 1210, data plane 1240, and input/output 1270. Bus 1260 is an on-chip coherent multi-processor bus that passes information between I/O 1270, control plane 1210, and data plane 1240. Input/output 1270 includes flexible input-output logic which dynamically assigns interface pins to input output controllers based upon peripheral devices that are connected to PEA 1200. For example, PEA 1200 may be connected to two peripheral devices, such as peripheral A and peripheral B, whereby each peripheral connects to a particular number of input and output pins on PEA 1200. In this example, the flexible input-output logic is configured to route PEA 1200's external input and output pins that are connected to peripheral A to a first input output controller (i.e. IOC A) and route PEA 1200's external input and output pins that are connected to peripheral B to a second input output controller (i.e. IOC B).

Figure 13A:
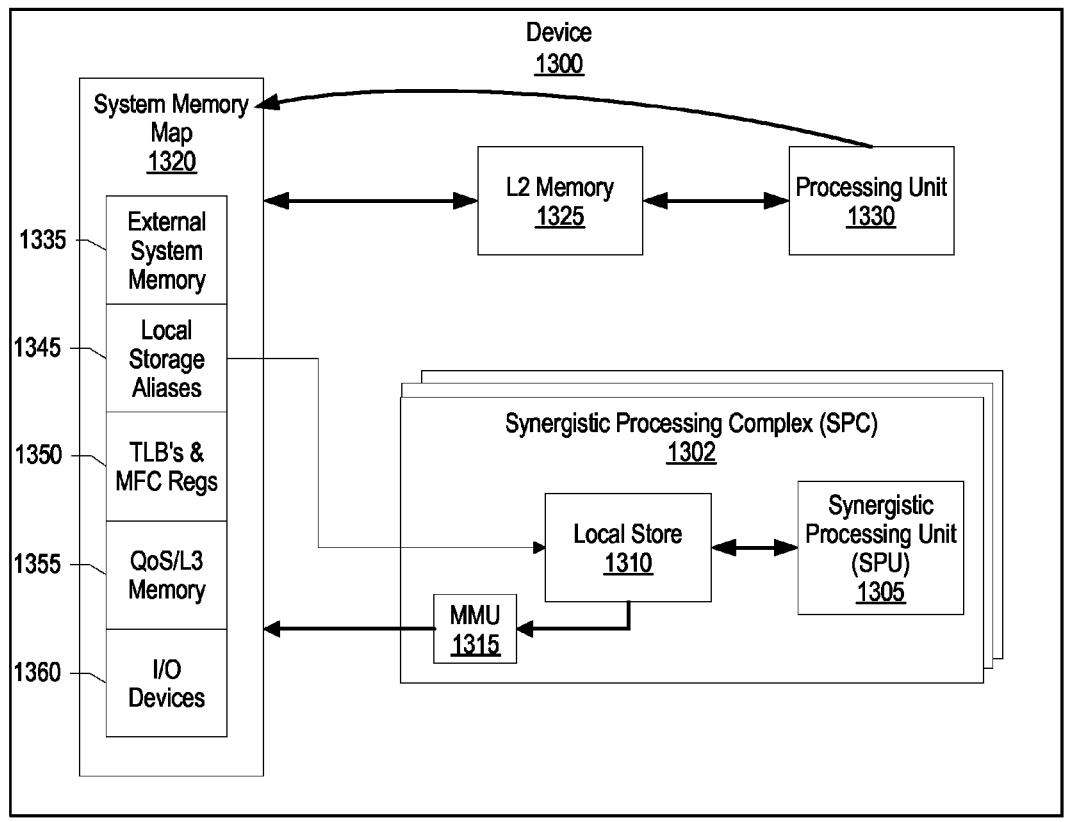
FIG. 13A illustrates a first information handling system which is a simplified example of a computer system capable of performing the computing operations described herein.

FIG. 13A illustrates an information handling system which is a simplified example of a computer system capable of performing the computing operations described herein. The example in FIG. 13A shows a plurality of heterogeneous processors, such as those shown in FIG. 12, using a common memory map in order to share memory between the heterogeneous processors. Device 1300 includes processing unit 1330 which executes an operating system for device 1300. Processing unit 1330 is similar to processing unit 1220 shown in FIG. 12. Processing unit 1330 uses system memory map 1320 to allocate memory space throughout device 1300. For example, processing unit 1330 uses system memory map 1320 to identify and allocate memory areas when processing unit 1330 receives a memory request. Processing unit 1330 accesses L2 memory 1325 for retrieving application and data information. L2 memory 1325 is similar to L2 memory 530 shown in FIG. 12.

System memory map 1320 separates memory mapping areas into regions which are regions 1335, 1345, 1350, 1355, and 1360. Region 1335 is a mapping region for external system memory which may be controlled by a separate input output device. Region 1345 is a mapping region for non-private storage locations corresponding to one or more synergistic processing complexes, such as SPC 1302. SPC 1302 is similar to the SPC's shown in FIG. 12, such as SPC A 1245. SPC 1302 includes local memory, such as local store 1310, whereby portions of the local memory may be allocated to the overall system memory for other processors to access. For example, 1 MB of local store 1310 may be allocated to non-private storage whereby it becomes accessible by other heterogeneous processors. In this example, local storage aliases 1345 manages the 1 MB of nonprivate storage located in local store 1310 (see FIG. 13B and corresponding text for further details regarding local store accessibility).

Region 1350 is a mapping region for translation lookaside buffer's (TLB's) and memory flow control (MFC registers. A translation lookaside buffer includes cross-references between virtual address and real addresses of recently referenced pages of memory. The memory flow control provides interface functions between the processor and the bus such as DMA control and synchronization.

Region 1355 is a mapping region for the operating system and is pinned system memory with bandwidth and latency guarantees. Region 1360 is a mapping region for input output devices that are external to device 1300 and are defined by system and input output architectures.

Synergistic processing complex (SPC) 1302 includes synergistic processing unit (SPU) 1305, local store 1310, and memory management unit (MMU) 1315. Processing unit 1330 manages SPU 1305 and processes data in response to processing unit 1330's direction. For example SPU 1305 may be a digital signaling processing core, a microprocessor core, a micro controller core, or a combination of these cores. Local store 1310 is a storage area that SPU 1305 configures for a private storage area and a non-private storage area. For example, if SPU 1305 requires a substantial amount of local memory, SPU 1305 may allocate 100% of local store 1310 to private memory. In another example, if SPU 1305 requires a minimal amount of local memory, SPU 1305 may allocate 10% of local store 1310 to private memory and allocate the remaining 90% of local store 1310 to non-private memory (see FIG. 13B and corresponding text for further details regarding local store configuration).

The portions of local store 1310 that are allocated to non-private memory are managed by system memory map 1320 in region 1345. These non-private memory regions may be accessed by other SPU's or by processing unit 1330. MMU 1315 includes a direct memory access (DMA) function and passes information from local store 1310 to other memory locations within device 1300.

Figure 13B:
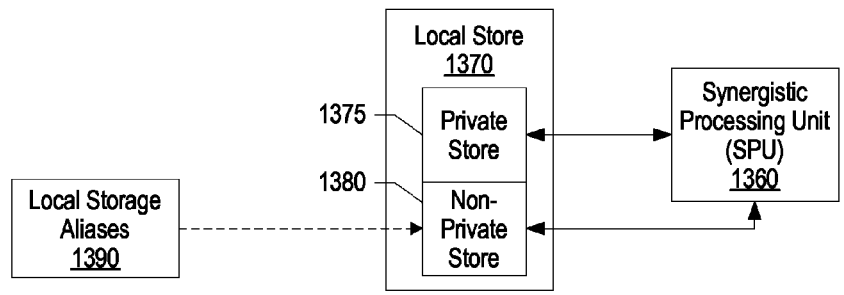
FIG. 13B is a diagram showing a local storage area divided into private memory and non-private memory.

FIG. 13B is a diagram showing a local storage area divided into private memory and non-private memory. During system boot, synergistic processing unit (SPU) 1360 partitions local store 1370 into two regions which are private store 1375 and non-private store 1380. SPU 1360 is similar to SPU 1305 and local store 1370 is similar to local store 1310 that are shown in FIG. 13A. Private store 1375 is accessible by SPU 1360 whereas non-private store 1380 is accessible by SPU 1360 as well as other processing units within a particular device. SPU 1360 uses private store 1375 for fast access to data. For example, SPU 1360 may be responsible for complex computations that require SPU 1360 to quickly access extensive amounts of data that is stored in memory. In this example, SPU 1360 may allocate 100% of local store 1370 to private store 1375 in order to ensure that SPU 1360 has enough local memory to access. In another example, SPU 1360 may not require a large amount of local memory and therefore, may allocate 10% of local store 1370 to private store 1375 and allocate the remaining 90% of local store 1370 to non-private store 1380.

A system memory mapping region, such as local storage aliases 1390, manages portions of local store 1370 that are allocated to non-private storage. Local storage aliases 1390 is similar to local storage aliases 1345 that is shown in FIG. 13A. Local storage aliases 1390 manages non-private storage for each SPU and allows other SPU's to access the non-private storage as well as a device's control processing unit.

Figure 14:
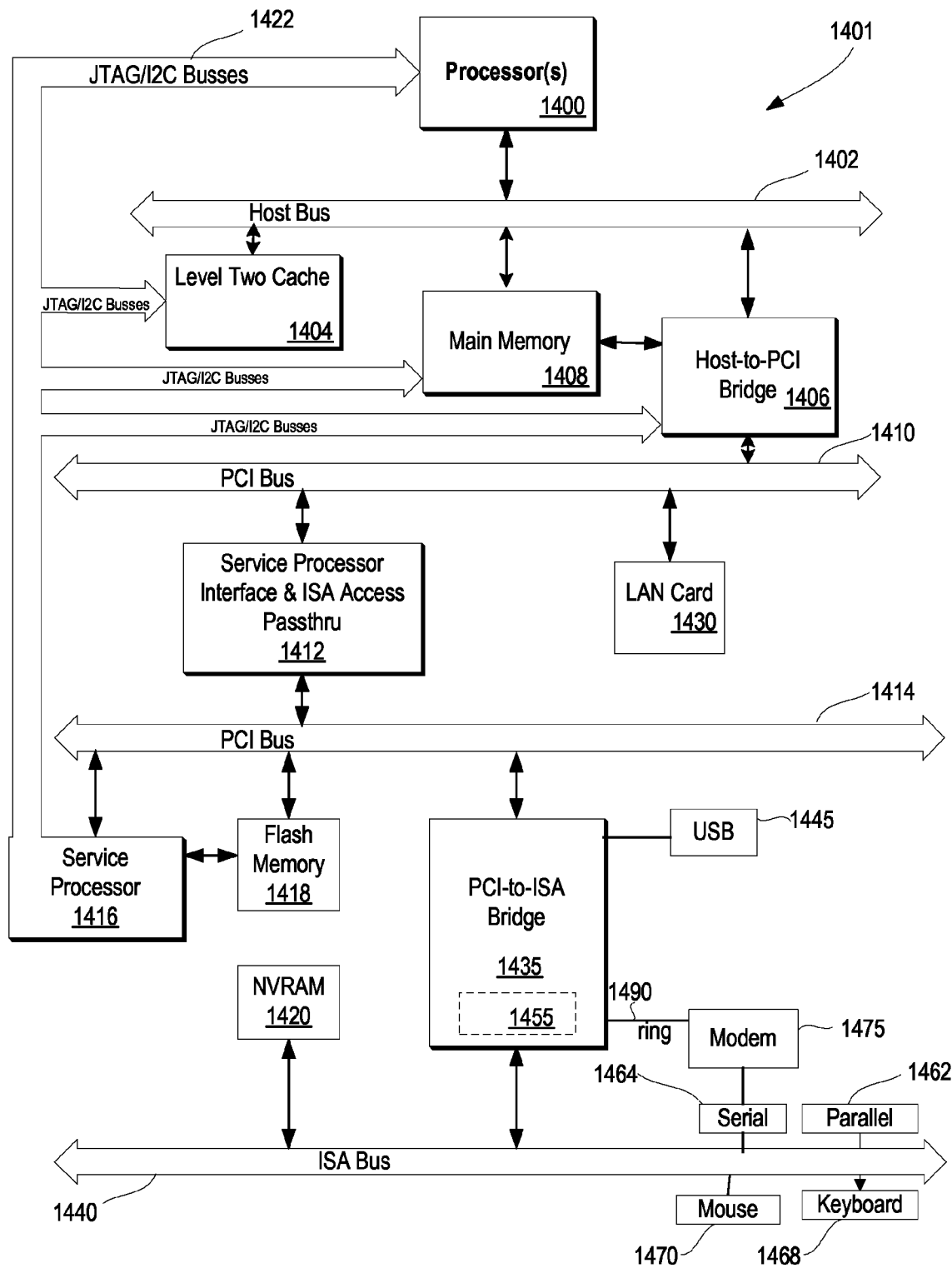
FIG. 14 is a block diagram of a second information handling system capable of implementing the present invention.

FIG. 14 illustrates information handling system 1401 which is a simplified example of a computer system capable of performing the computing operations described herein. Computer system 1401 includes processor 1400 which is coupled to host bus 1402. A level two (L2) cache memory 1404 is also coupled to host bus 1402. Host-to-PCI bridge 1406 is coupled to main memory 1408, includes cache memory and main memory control functions, and provides bus control to handle transfers among PCI bus 1410, processor 1400, L2 cache 1404, main memory 1408, and host bus 1402. Main memory 1408 is coupled to Host-to-PCI bridge 1406 as well as host bus 1402. Devices used solely by host processor(s) 1400, such as LAN card 1430, are coupled to PCI bus 1410. Service Processor Interface and ISA Access Pass-through 1412 provides an interface between PCI bus 1410 and PCI bus 1414. In this manner, PCI bus 1414 is insulated from PCI bus 1410. Devices, such as flash memory 1418, are coupled to PCI bus 1414. In one implementation, flash memory 1418 includes BIOS code that incorporates the necessary processor executable code for a variety of low-level system functions and system boot functions.

PCI bus 1414 provides an interface for a variety of devices that are shared by host processor(s) 1400 and Service Processor 1416 including, for example, flash memory 1418. PCI-to-ISA bridge 1435 provides bus control to handle transfers between PCI bus 1414 and ISA bus 1440, universal serial bus (USB) functionality 1445, power management functionality 1455, and can include other functional elements not shown, such as a real-time clock (RTC), DMA control, interrupt support, and system management bus support. Nonvolatile RAM 1420 is attached to ISA Bus 1440. Service Processor 1416 includes JTAG and I2C busses 1422 for communication with processor(s) 1400 during initialization steps. JTAG/I2C busses 1422 are also coupled to L2 cache 1404, Host-to-PCI bridge 1406, and main memory 1408 providing a communications path between the processor, the Service Processor, the L2 cache, the Host-to-PCI bridge, and the main memory. Service Processor 1416 also has access to system power resources for powering down information handling device 1401.

Peripheral devices and input/output (I/O) devices can be attached to various interfaces (e.g., parallel interface 1462, serial interface 1464, keyboard interface 1468, and mouse interface 1470 coupled to ISA bus 1440. Alternatively, many I/O devices can be accommodated by a super I/O controller (not shown) attached to ISA bus 1440.

In order to attach computer system 1401 to another computer system to copy files over a network, LAN card 1430 is coupled to PCI bus 1410. Similarly, to connect computer system 1401 to an ISP to connect to the Internet using a telephone line connection, modem 1475 is connected to serial port 1464 and PCI-to-ISA Bridge 1435.

While the computer system described in FIGS. 12, 13A, 13B, and 14 are capable of executing the processes described herein, this computer system is simply one example of a computer system. Those skilled in the art will appreciate that many other computer system designs are capable of performing the processes described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer program product stored on a computer readable storage media, the computer readable media containing instructions for execution by a computer, which, when executed by the computer, cause the computer to implement a method comprising:

identifying one or more prolonged instructions in a process;

dividing the process into a plurality of threads based upon the number of identified prolonged instructions;

inserting, by a compiler, conditional branching logic after each of the identified prolonged instructions in each of the plurality of threads, wherein a first of the plurality of threads is programmed to conditionally branch to a second of the plurality of threads and wherein a last of the plurality of threads is programmed to conditionally branch back to the first thread; and executing the plurality of threads after the insertion of the conditional branching logic, wherein the executing comprises:

storing a "return to" address in a hardware register for each of the threads, the "return to" address being an address to resume execution of the thread;

mapping a logical "return to" register for each of the threads to the hardware register corresponding to each of the respective threads used to store the respective threads' "return to" address;

mapping a logical "branch to" register for each of the threads to the hardware register that corresponds to another of the plurality of threads so that each of the threads' logical "branch to" registers points to a different thread from the plurality of threads; and branching from a first of the plurality of threads to a second of the plurality of threads using the "return to" address corresponding to the second thread, wherein the branching is to the logical "branch to" address of the first thread and to the logical "return to" address of the second thread, wherein the logical "branch to" address of the first thread and the logical "return to" address of the second thread are the same address.

2. The computer program product of claim 1 wherein the method further comprises:
   completing execution of the second thread; and
   remapping the logical "branch to" address for the first thread to the hardware register corresponding to the third thread in response to the completing the second thread.

3. The computer program product of claim 1 wherein the method further comprises:
   executing a prolonged instruction in the first thread; and
   branching from the first thread to the second thread after executing the prolonged instruction, the branching in response to data from the prolonged instruction not being available.

4. The computer program product of claim 3 wherein the method further comprises:
   branching from one of the plurality of threads back to the first thread;
   determining, at the first thread after receiving control from one of the threads, that data from the prolonged instruction is not yet available; and
   branching from the first thread to the second thread after the determination.

5. The computer program product of claim 1 wherein the method further comprises:
   associating a "return to" register and a "branch to" register for each of the threads, wherein the "return to" register is used to store a resume point of the thread and wherein the "branch to" register is used to store a branch point within another thread within the plurality of threads, the associating performed so that a resume address of each thread is pointed to by the address stored in the "branch to" register of exactly one other thread; and
   altering the associations in response to one of the threads completing, the altering changing one of the "branch to" registers in order to bypass the completed thread.

6. An information handling system comprising:
   one or more processors;
   a memory area accessible by one or more of the processors; and
   a thread control management tool for managing a plurality of threads, the thread control management tool effective to:
   identify one or more prolonged instructions in a process;
   divide the process into a plurality of threads based upon the number of identified prolonged instructions;
   insert, by a compiler, conditional branching logic after each of the identified prolonged instructions in each of the plurality of threads, wherein a first of the plurality of threads is programmed to conditionally branch to a second of the plurality of threads and wherein a last of the plurality of threads is programmed to conditionally branch back to the first thread; and
   execute the plurality of threads after the insertion of the conditional branching logic, wherein the executing is effective to:
      store a "return to" address in a hardware register for each of the threads, the "return to" address being an address to resume execution of the thread;
      map a logical "return to" register for each of the threads to the hardware register corresponding to each of the respective threads used to store the respective threads' "return to" address;
      map a logical "branch to" register for each of the threads to the hardware register that corresponds to another of the plurality of threads so that each of the threads' logical "branch to" registers points to a different thread from the plurality of threads; and
      branch from a first of the plurality of threads to a second of the plurality of threads using the "return to" address corresponding to the second thread, wherein the branching is to the logical "branch to" address of the first thread and to the logical "return to" address of the second thread, wherein the logical "branch to" address of the first thread and the logical "return to" address of the second thread are the same address.

7. The information handling system of claim 6 wherein the thread control management tool is effective to:
   complete execution of the second thread; and
   remap the logical "branch to" address for the first thread to the hardware register corresponding to the third thread in response to the completing the second thread.

8. The information handling system of claim 1 wherein the thread control management tool is effective to:
   execute a prolonged instruction in the first thread; and
   branch from the first thread to the second thread after executing the prolonged instruction, the branching in response to data from the prolonged instruction not being available.

9. The information handling system of claim 8 wherein the thread control management tool is effective to:
   branch from one of the plurality of threads back to the first thread;
   determine, at the first thread after receiving control from one of the threads, that data from the prolonged instruction is not yet available; and
   branch from the first thread to the second thread after the determination.

10. The information handling system of claim 6 wherein the thread control management tool is effective to:
    associate a "return to" register and a "branch to" register for each of the threads, wherein the "return to" register is used to store a resume point of the thread and wherein the "branch to" register is used to store a branch point within another thread within the plurality of threads, the associating performed so that a resume address of each thread is pointed to by the address stored in the "branch to" register of exactly one other thread; and
    alter the associations in response to one of the threads completing, the altering changing one of the "branch to" registers in order to bypass the completed thread.

* * * * *